(12) United States Patent
Kloubec

(10) Patent No.: US 6,511,698 B1
(45) Date of Patent: Jan. 28, 2003

(54) ANIMAL FEED AND METHOD OF MAKING SAME

(75) Inventor: Myron J. Kloubec, Amana, IA (US)

(73) Assignee: Wholesale Feeds, Inc., Marion, IA (US)

(*) Notice: Subject to any disclaimer, the term of this patent is extended or adjusted under 35 U.S.C. 154(b) by 87 days.

(21) Appl. No.: 09/506,104

(22) Filed: Jun. 7, 2000

Related U.S. Application Data
(60) Provisional application No. 60/120,580, filed on Feb. 18, 1999.

(51) Int. Cl.⁷ .................................................. A23K 1/14
(52) U.S. Cl. ....................... 426/623; 426/624; 426/630; 426/635; 426/658; 426/807
(58) Field of Search ................................ 426/623, 624, 426/630, 635, 807, 658

(56) References Cited

U.S. PATENT DOCUMENTS

| | | | | |
|---|---|---|---|---|
| 4,642,241 A | * | 2/1987 | Noguchi | 426/634 |
| 5,629,038 A | * | 5/1997 | Kalmbach | 426/72 |
| 5,900,262 A | * | 5/1999 | Iritani et al. | 426/53 |

FOREIGN PATENT DOCUMENTS

| | | | |
|---|---|---|---|
| DE | 4108319 | * | 11/1991 |
| WO | 9849903 | * | 11/1998 |

OTHER PUBLICATIONS

Batajoo et al., Animal feed science & Technol. vol. 71 (1–2), pp. 165–176, 1998.*
Feedstuffo, Apr. 11, p. 16, 1994.*
Westers New Universal Unabridged Dictionary Barnes & Noble Bonds, publishers, p. 907, 1992.*

* cited by examiner

Primary Examiner—Chhaya D. Sayala
(74) Attorney, Agent, or Firm—Brian J. Laurenzo; Michael C. Gilchrist

(57) ABSTRACT

An animal food and method for making the same includes a mixture of a protein-containing substance with a carrier. The carrier can comprise particles, such as wheat middlings, saw dust, ground corn, or soybean meal. The protein-containing substance adheres to the carrier. The protein-containing substance can be commodity grain byproducts or waste products. The mixture can then be fed to animals directly, can be extruded into pellets ox shapes, or can be added to other feeds as a supplement. The method of making the food includes mixing the protein-containing substance and carrier and drying the mixture to about 10%–20% moisture content.

26 Claims, 19 Drawing Sheets

FIG. 2 genencor/sbm/34% formula 153   genencor /sbm / 34%cp          sequence 153  requirement 0

| NUM | INGREDIENT | AS FED | %AF | NUM | NUTRIENT | AMOUNT | UNIT |
|---|---|---|---|---|---|---|---|
| 133 | VITAMIN C | 6.200 | 0.310 | 3 | DRY MATTER | 100.0000 | % |
| 13 | CATFISH VIT MIX | 6.200 | 0.310 | 4 | AS FED | 90.8550 | % |
| 22 | CATFISH MIN MIX | 16.200 | 0.810 | 5 | DE | 3496.5044 | KCAL/KG |
| 23 | CORN GLUTEN MEAL | 87.000 | 4.350 | 6 | PROTEIN | 34.1685 | % |
| 25 | CORN GRAIN | 431.582 | 21.579 | 7 | CALCIUM | 0.8256 | % |
| 99 | DH SOYBEAN ME 49% | 589.387 | 29.469 | 8 | AVAIL PHOS | 0.6993 | % |
| 153 | CANOLA OIL | 147.547 | 7.377 | 9 | FAT | 9.0383 | % |
| 17 | CHOLINE 70% | 3.000 | 0.150 | 10 | FIBER | 3.3383 | % |
| 16 | CALCIUM PHOS DI | 62.881 | 3.144 | 11 | PHE & TYR | 3.1076 | % |
| 4 | METHIONINE | 10.000 | 0.500 | 12 | AVAIL ARG | 1.7797 | % |
| 3 | LYSINE | 40.000 | 2.000 | 13 | AVAIL HIST | 0.7363 | % |
| 160 | GENENCOR | 600.000 | 30.000 | 14 | AVAIL ILEU | 2.0049 | % |
|  |  |  |  | 15 | AVAIL LEU | 2.7257 | % |
|  | TOTAL | 1999.997 | 100.00 | 16 | AVAIL LYS | 3.8858 | % |
|  |  |  |  | 17 | AVAIL MET | 0.8591 | % |
|  |  |  |  | 18 | AVAIL CYS | 0.3807 | % |
|  |  |  |  | 19 | A MET + CYS | 1.2420 | % |
|  |  |  |  | 20 | AVAIL PHEN | 1.5248 | % |
|  |  |  |  | 21 | AVAIL TYR | 1.1478 | % |
|  |  |  |  | 22 | AVAIL THRE | 1.2343 | % |
|  |  |  |  | 23 | AVAIL TRYP | 0.3023 | % |
|  |  |  |  | 24 | AVAIL VAL | 1.7608 | % |
|  |  |  |  | 25 | POTASSIUM | 0.6847 | % |
|  |  |  |  | 26 | CHLORINE | 0.0230 | % |
|  |  |  |  | 27 | MAGNESIUM | 0.1289 | % |
|  |  |  |  | 28 | SODIUM | 0.0208 | % |
|  |  |  |  | 29 | SULFUR | 0.0235 | % |
|  |  |  |  | 30 | COPPER | 64.9895 | MG/KG |
|  |  |  |  | 31 | IRON | 1068.9823 | MG/KG |
|  |  |  |  | 32 | MANGANESE | 831.4483 | MG/KG |
|  |  |  |  | 33 | SELENIUM | 0.3981 | MG/KG |
|  |  |  |  | 34 | ZINC | 1649.7262 | MG/KG |
|  |  |  |  | 35 | COBALT | 0.0001 | % |
|  |  |  |  | 36 | FLUORINE | 0.0057 | % |
|  |  |  |  | 37 | IODINE | 0.0019 | % |
|  |  |  |  | 38 | BIOTIN | 0.1172 | MG/KG |
|  |  |  |  | 39 | CHOLINE | 1985.1497 | MG/KG |
|  |  |  |  | 40 | FOLIC ACID | 7.1041 | MG/KG |
|  |  |  |  | 41 | NIACIN | 286.8965 | MG/KG |
|  |  |  |  | 42 | PANT ACID | 115.1983 | MG/KG |
|  |  |  |  | 43 | VIT B6 | 36.9062 | MG/KG |
|  |  |  |  | 44 | RIBOFLAVIN | 42.1032 | MG/KG |
|  |  |  |  | 45 | THIAMIN | 35.7559 | MG/KG |
|  |  |  |  | 46 | VIT B12 | 34.1000 | MCG/KG |
|  |  |  |  | 47 | VIT E | 211.2852 | MG/KG |
|  |  |  |  | 48 | VIT K | 13.6832 | MG/KG |
|  |  |  |  | 49 | VIT A | 413640.7168 | IU/KG |
|  |  |  |  | 50 | VIT D | 6819.9985 | IU/KG |
|  |  |  |  | 51 | VIT C | 3099.9995 | MG/KG |
|  |  |  |  | 60 | NFE | 12.9600 | % |

FIG. 3

```
genencor/sbm/30%                          sequence 154    requirement 0
formula 154    genencor /sbm / 30%cp
NUM      INGREDIENT         AS FED    %AF      NUM  NUTRIENT      AMOUNT      UNIT
133      VITAMIN C           6.200    0.310     3   DRY MATTER    100.0000    %
13       CATFISH VIT MIX     6.200    0.310     4   AS FED         90.8557    %
22       CATFISH MIN MIX    16.200    0.810     5   DE           3487.8533    KCAL/KG
23       CORN GLUTEN MEAL   92.552    4.628     6   PROTEIN        30.2000    %
25       CORN GRAIN        499.999   25.000     7   CALCIUM         0.7480    %
136      CORN GLUTEN FEED  207.79    10.39      8   AVAIL PHOS      0.7000    %
99       DH SOYBEAN ME 49% 298.994   14.950     9   FAT            10.0000    %
153      CANOLA OIL        157.577    7.879    10   FIBER           4.0920    %
17       CHOLINE 70%         3.000    0.150    11   PHE & TYR       2.7136    %
16       CALCIUM PHOS DI    58.509    2.925    12   AVAIL ARG       1.3500    %
137      THR                 2.978    0.149    13   AVAIL HIST      0.6535    %
4        METHIONINE         10.000    0.500    14   AVAIL ILEU      1.7969    %
3        LYSINE             40.000    2.000    15   AVAIL LEU       2.5023    %
160      GENENCOR          600.000   30.000    16   AVAIL LYS       3.5128    %
                                               17   AVAIL MET       0.8620    %
                         ------------------    18   AVAIL CYS       0.3356    %
                          1999.99    100       19   A MET + CYS     1.1642    %
                                               20   AVAIL PHEN      2.2936    %
                                               21   AVAIL TYR       0.9949    %
                                               22   AVAIL THRE      1.2000    %
                                               23   AVAIL TRYP      0.2232    %
                                               24   AVAIL VAL       1.5337    %
                                               25   POTASSIUM       0.4650    %
                                               26   CHLORINE        0.0447    %
                                               27   MAGNESIUM       0.1246    %
                                               28   SODIUM          0.0311    %
                                               29   SULFUR          0.1606    %
                                               30   COPPER         62.2782    MG/KG
                                               31   IRON         1021.0556    MG/KG
                                               32   MANGANESE     825.6353    MG/KG
                                               33   SELENIUM        0.3868    MG/KG
                                               34   ZINC         1642.4497    MG/KG
                                               35   COBALT          0.0001    %
                                               36   FLUORINE        0.0053    %
                                               37   IODINE          0.0019    %
                                               38   BIOTIN          0.0737    MG/KG
                                               39   CHOLINE      1603.5861    MG/KG
                                               40   FOLIC ACID      7.0135    MG/KG
                                               41   NIACIN        284.6990    MG/KG
                                               42   PANT ACID      13.2796    MG/KG
                                               43   VIT B6         36.3777    MG/KG
                                               44   RIBOFLAVIN     41.7276    MG/KG
                                               45   THIAMIN        35.7227    MG/KG
                                               46   VIT B12        34.1000    MCG/KG
                                               47   VIT E         211.8336    MG/KG
                                               48   VIT K          13.6900    MG/KG
                                               49   VIT A       13640.8311    IU/KG
                                               50   VIT D        6819.9995    IU/KG
                                               51   VIT C        3099.9930    MG/KG
                                               60   NPE            12.9600    %
```

FIG. 4 genencor/wheat/34%cp  
formula 155    genencor /sbm / 34%cp sequence 155    requirement 0

| NUM | INGREDIENT | AS FED | %AF |
|---|---|---|---|
| 133 | VITAMIN C | 6.000 | 0.300 |
| 13 | CATFISH VIT MIX | 6.000 | 0.300 |
| 22 | CATFISH MIN MIX | 16.000 | 0.800 |
| 113 | WHEAT MIDDLINGS | 763.239 | 30.162 |
| 153 | CANOLA OIL | 67.495 | 3.375 |
| 17 | CHOLINE 70% | 2.800 | 0.140 |
| 16 | CALCIUM PHOS DI | 35.774 | 1.789 |
| 137 | THR | 2.547 | 0.127 |
| 4 | METHIONINE | 13.279 | 0.659 |
| 160 | GENENCOR | 1086.965 | 54.340 |
|  |  | 1999.998 | 100 |

| NUM | NUTRIENT | AMOUNT | UNIT |
|---|---|---|---|
| 3 | DRY MATTER | 100.0000 | % |
| 4 | AS FED | 90.1931 | % |
| 5 | DE | 3220.8967 | %CAL/KG |
| 6 | PROTEIN | 34.1658 | % |
| 7 | CALCIUM | 0.5467 | % |
| 8 | AVAIL PHOS | 0.4995 | % |
| 9 | FAT | 5.9940 | % |
| 10 | FIBER | 5.8837 | % |
| 11 | PHE & TYR | 3.6806 | % |
| 12 | AVAIL ARG | 1.2445 | % |
| 13 | AVAIL HIST | 0.6151 | % |
| 14 | AVAIL ILEU | 2.3838 | % |
| 15 | AVAIL LEU | 2.0864 | % |
| 16 | AVAIL LYS | 1.7936 | % |
| 17 | AVAIL MET | 0.8211 | % |
| 18 | AVAIL CYS | 0.1736 | % |
| 19 | A MET + CYS | 1.0290 | % |
| 20 | AVAIL PHEN | 1.1920 | % |
| 21 | AVAIL TYR | 0.8868 | % |
| 22 | AVAIL THRE | 1.1988 | % |
| 23 | AVAIL TRYP | 0.1736 | % |
| 24 | AVAIL VAL | 1.6535 | % |
| 25 | POTASSIUM | 0.3029 | % |
| 26 | CHLORINE | 0.0153 | % |
| 27 | MAGNESIUM | 0.1476 | % |
| 28 | SODIUM | 0.0658 | % |
| 29 | SULFUR | 0.0847 | % |
| 30 | COPPER | 63.4297 | MG/KG |
| 31 | IRON | 842.0906 | MG/KG |
| 32 | MANGANESE | 847.9291 | MG/KG |
| 33 | SELENIUM | 0.5820 | MG/KG |
| 34 | ZINC | 1641.0964 | MG/KG |
| 35 | COBALT | 0.0001 | % |
| 36 | FLUORINE | 0.0032 | % |
| 37 | IODINE | 0.0019 | % |
| 38 | BIOTIN | 0.0916 | MG/KG |
| 39 | CHOLINE | 1457.7881 | MG/KG |
| 40 | FOLIC ACID | 6.9816 | MG/KG |
| 41 | NIACIN | 298.7276 | MG/KG |
| 42 | PANT ACID | 112.2021 | MG/KG |
| 43 | VIT B6 | 36.0530 | MG/KG |
| 44 | RIBOFLAVIN | 40.3633 | MG/KG |
| 45 | THIAMIN | 38.2664 | MG/KG |
| 46 | VIT B12 | 33.0000 | MCG/KG |
| 47 | VIT E | 206.7774 | MG/KG |
| 48 | VIT K | 13.2000 | MG/KG |
| 49 | VIT A | 13200.0098 | IU/KG |
| 50 | VIT D | 6600.0049 | IU/KG |
| 51 | VIT C | 3000.0022 | MG/KG |
| 60 | NFE | 23.4785 | % |

FIG. 5 genencor/wheat/30%cp  sequence 156  requirement 0
formula 156  genencor /wheat / 30%cp

| NUM | INGREDIENT | AS FED | %AF |
|---|---|---|---|
| 133 | VITAMIN C | 6.200 | 0.310 |
| 13 | CATFISH VIT MIX | 6.200 | 0.310 |
| 22 | CATFISH MIN MIX | 16.200 | 0.810 |
| 113 | WHEAT MIDDLINGS | 799.999 | 40.000 |
| 15 | SOYBEAN OIL | 149.153 | 7.458 |
| 17 | CHOLINE 70% | 3.000 | 0.150 |
| 16 | CALCIUM PHOS DI | 57.554 | 2.878 |
| 137 | THR | 5.858 | 0.293 |
| 4 | METHIONINE | 14.258 | 0.713 |
| 3 | LYSINE | 38.969 | 1.948 |
| 160 | GENENCOR | 902.603 | 45.130 |
|  |  | 1999.998 | 100 |

| NUM | NUTRIENT | AMOUNT | UNIT |
|---|---|---|---|
| 3 | DRY MATTER | 100.0000 | % |
| 4 | AS FED | 90.6602 | % |
| 5 | DE | 3268.7598 | KCAL/KG |
| 6 | PROTEIN | 30.1698 | % |
| 7 | CALCIUM | 0.7650 | % |
| 8 | AVAIL PHOS | 0.6993 | % |
| 9 | FAT | 9.9900 | % |
| 10 | FIBER | 5.4924 | % |
| 11 | PHE & TYR | 3.5326 | % |
| 12 | AVAIL ARG | 1.1032 | % |
| 13 | AVAIL HIST | 0.5382 | % |
| 14 | AVAIL ILEU | 2.0252 | % |
| 15 | AVAIL LEU | 1.8082 | % |
| 16 | AVAIL LYS | 3.4852 | % |
| 17 | AVAIL MET | 0.6591 | % |
| 18 | AVAIL CYS | 0.1583 | % |
| 19 | A MET + CYS | 1.0534 | % |
| 20 | AVAIL PHEN | 1.0363 | % |
| 21 | AVAIL TYR | 0.7638 | % |
| 22 | AVAIL THRE | 1.1588 | % |
| 23 | AVAIL TRYP | 0.1583 | % |
| 24 | AVAIL VAL | 1.4254 | % |
| 25 | POTASSIUM | 0.4020 | % |
| 26 | CHLORINE | 0.0160 | % |
| 27 | MAGNESIUM | 0.1604 | % |
| 28 | SODIUM | 0.0694 | % |
| 29 | SULFUR | 0.0999 | % |
| 30 | COPPER | 64.5878 | MG/KG |
| 31 | IRON | 1003.1083 | MG/KG |
| 32 | MANGANESE | 853.1459 | MG/KG |
| 33 | SELENIUM | 0.6056 | MG/KG |
| 34 | ZINC | 1664.0779 | MG/KG |
| 35 | COBALT | 0.0001 | % |
| 36 | FLUORINE | 0.0052 | % |
| 37 | IODINE | 0.0019 | % |
| 38 | BIOTIN | 0.0960 | MG/KG |
| 39 | CHOLINE | 1550.8004 | MG/KG |
| 40 | FOLIC ACID | 7.2200 | MG/KG |
| 41 | NIACIN | 309.2001 | MG/KG |
| 42 | PANT ACID | 116.0400 | MG/KG |
| 43 | VIT B6 | 37.3000 | MG/KG |
| 44 | RIBOFLAVIN | 41.7200 | MG/KG |
| 45 | THIAMIN | 39.6200 | MG/KG |
| 46 | VIT B12 | 34.1000 | MCG/KG |
| 47 | VIT E | 213.8000 | MG/KG |
| 48 | VIT K | 13.6400 | MG/KG |
| 49 | VIT A | 13640.0029 | IU/KG |
| 50 | VIT D | 6820.0015 | IU/KG |
| 51 | VIT C | 3100.0010 | MG/KG |
| 60 | NPE | 19.4263 | % |

FIG. 6

|  | RESULTS LISTED BELOW |
|---|---|
| AMINO ACID PROFILE | 0.15 % |
| TRYTOPHAN | 1.84 % |
| ASPARTIC ACID | 0.89 % |
| THREONINE | 0.75 % |
| SERINE | 3.41 % |
| GLUTAMIC ACID | 1.16 % |
| PROLINE | 0.94 % |
| GLYCINE | 1.82 % |
| ALANINE | 0.25 % |
| CYSTINE | 1.04 % |
| VALINE | 0.35 % |
| METHIONINE | 0.79 % |
| ISOLEUCINE | 1.49 % |
| TYROSINE | 0.44 % |
| PHENYLALANINE | 0.74 % |
| HISTIDINE | 0.55 % |
| LYSINE, TOTAL | 0.95 % |
| ARGININE | 0.77 % |
|  |  |
| PROTEIN | 25.62 % |
| FAT | 2.19 % |

AVERAGE OF 2 ASSAYS

FIG. 7

| TEST | RESULTS | UNITS | LAB CODE # |
|---|---|---|---|
| FIBER, CRUDE | 0.1 | % | 5023050028 |
| ASH | 6.85 | % | 5007050028 |
| NITROGEN-KJELDAHL | 6.48 | % | 5056050028 |
| CALORIES CALCULATED IN FEED | 721 | KCAL/LB | 5013050028 |
| AMMONIACAL NITROGEN | 4.72 | % | 5003050022 |
| SPECIFIC GRAVITY BY HYDROMETER | 1.177 | G/CC @20C | 3640050022 |
| POTASSIUM | 0.042 | % | 3062050022 |
| SODIUM | 0.18 | % | 3068050022 |
| CRUDE FAT BY ACID HYDROLYSIS | 0.48 | % | 3571050022 |
| MOISTURE BY VACUUM OVEN | 54.06 | % | 5041050022 |
| pH | 4.5 | % | 3056050022 |
| AMINO ACID PROFILE | LISTED BELOW | | |
| TRYPTOPHAN | 0.05 | % | 1031050022 |
| ASPARTIC ACID | 0.82 | % | 1012050022 |
| THREONINE | 0.25 | % | 1024050022 |
| SERINE | 0.23 | % | 1023050022 |
| GLUTAMIC ACID | 3.04 | % | 1014050022 |
| PROLINE | 0.17 | % | 1022050022 |
| GLYCINE | 0.35 | % | 1015050022 |
| ALANINE | 1.59 | % | 1010050022 |
| CYSTINE | 0.03 | % | 1013050022 |
| VALINE | 0.37 | % | 1026050022 |
| METHIONINE | 0.05 | % | 1020050022 |
| ISOLEUCINE | 0.23 | % | 1017050022 |
| LEUCINE | 0.39 | % | 1018050022 |
| TYROSINE | 0.04 | % | 1025050022 |
| PHENYLALANINE | 0.18 | % | 1021050022 |
| HISTIDINE | 0.13 | % | 1016050022 |
| LYSINE, TOTAL | 0.27 | % | 1005050022 |
| ARGININE | 0.23 | % | 1011050022 |

FIG. 8

REPORT OF ANALYSIS

| TEST | RESULTS | UNITS |
|---|---|---|
| FIBER, CRUDE | 0.2 | % |
| ASH | 6.94 | % |
| NITROGEN | 6.54 | % |
| AMMONIACAL NITROGEN | 4.74 | % |
| SPECIFIC GRAVITY BY HYDROMETE | 1.174 | % |
| POTASSIUM | 0.9 | % |
| SODIUM | 1.9 | % |
| CRUDE FAT BY ACID HYDROLYSIS | 0.4 | % |
| pH | 4.4 | % |

CALCULATED PROTEIN EQUALS 40.9%

| ANALYSIS | RESULTS | COMMENTS |
|---|---|---|
| ASSAY | | |
| LOD | | |
| SPECIFIC ROTATION | | |
| pH | 4.27 | |
| BULK DENSITY | | |
| ARSENIC | | |
| LEAD | | |
| HEAVY METALS | | |
| CHLORIDE | | |
| COLOR | | |
| COLOR(MINOLTA) | | |
| CONTAMINATION | | |
| CRYSTAL SIZE | 20      20 | |
| | 30      60 | |
| | 40      80 | |
| | 60     100 | |
| | 80     140 | |
| | 100    170 | |
| | PAN    PAN | |
| MIRCO.           TOTAL | | |
| MOLD/YEAST | | |
| COLIFORMS/SALMONELLA | | |
| SPECIFIC GRAVITY | 1.177 @ 20 degrees C | |
| BRIX | | |
| TOTAL NITROGEN | 6.10 % | |
| TOTAL SOLIDS | 41.33 % | |
| CRUDE PROTEIN | 38.13 % | |
| | | |

FIG. 10

| NUM | INGREDIENTS | AMOUNTS ROUNDED | < PRICES > LOW | TRUE HIGH | <PERCENT> MIN | DRY M. | MAX | COST | NUTRIENTS | UNITS | AMOUNTS MIN | ACTUAL | MAX |
|---|---|---|---|---|---|---|---|---|---|---|---|---|---|
| 50 | genencor | 1233.52 | 0.00 | 0.25 | 50.00 | 61.68 | 80.00 | | WEIGHT | | 1.00 | 1.00 | 1.00 |
| 13 | WHEAT MIDDLINGS | 552.90 | 0.00 | 5.25 | 0.00 | 27.87 | 40.00 | | AS FED | % | | 90.47 | |
| 53 | Canola Oil | 113.83 | 0.00 | 5.25 | 0.00 | 5.69 | 10.00 | | PROTEIN | % | 36.00 | 36.20 | 36.20 |
| 26 | CALCIUM PHOS DI | 48.50 | 0.00 | 5.25 | 0.00 | 2.41 | 5.00 | | AVAIL PHOS | % | 0.50 | 0.99 | 0.70 |
| 4 | METHIONINE | 19.40 | 0.00 | 50.00 | 0.00 | 0.80 | 1.50 | | CALCIUM | % | | 0.68 | |
| 33 | VITAMIN C | 9.70 | 0.00 | 625.00 | 0.50 | 0.50 | 0.52 | | FAT | % | 8.00 | 6.00 | 12.00 |
| 17 | CHOLINE 70% | 5.70 | 0.00 | 60.00 | 0.20 | 0.40 | 0.40 | | AVAIL ARG | % | 1.50 | 1.28 | NONE |
| 13 | CATFISH VIT MIX | 9.70 | 0.00 | 610.00 | 0.30 | 0.30 | 0.31 | | AVAIL HIST | % | 0.60 | 0.65 | NONE |
| 37 | THR | 0.00 | 0.00 | 50.00 | 0.00 | 0.21 | 0.50 | | PHE & TYR | % | | 3.43 | |
| 22 | CATFISH MIN MIX | 0.00 | 0.00 | 24.65 | 0.15 | 0.15 | 0.16 | | AVAIL ILEU | % | 1.10 | 2.62 | NONE |
| 95 | SOYBEAN OIL | | 0.00 | 5.25 | | | 10.00 | | AVAIL LEU | % | 1.20 | 2.23 | NONE |
| 3 | LYSINE | | 0.00 | 50.00 | | | 2.00 | | AVAIL LYS | % | 1.80 | 1.95 | 2.00 |
| | | | | | | | | | AVAIL MET | % | 0.96 | 0.96 | NONE |
| | | | | | | | | | AVAIL CYS | % | 0.19 | 0.17 | NONE |
| | | | | | | | | | A MET + CYS | % | 1.16 | 1.16 | NONE |
| | | | | | | | | | AVAIL PHEN | % | 1.35 | 1.27 | NONE |
| | | | | | | | | | AVAIL TYR | % | 0.64 | 0.96 | NONE |
| | TOTAL WEIGHT | 1997.25 | | | | | | | AVAIL THRE | % | 1.35 | 1.35 | NONE |
| | PRICE/TON(WET) | 154.32 | | | | | | | AVAIL TRYP | % | 0.36 | 0.17 | NONE |
| | PRICE/TON(DRY) | 154.32 | | | | | | | AVAIL VAL | % | 1.00 | 1.71 | NONE |
| | | | | | | | | | FIBER | % | 0.00 | 5.55 | 8.00 |
| | | | | | | | | | DE | KCAL/KG | 2700.000 | 3500.00 | 3500.000 |
| | | | | | | | | | POTASSIUM | % | | 0.28 | |
| | | | | | | | | | CHLORINE | % | | 0.01 | |
| | | | | | | | | | MAGNESIUM | % | | 0.11 | |
| | | | | | | | | | SODIUM | % | | 0.05 | |
| | | | | | | | | | SULFUR | % | | 0.07 | |
| | | | | | | | | | COPPER | MG/KG | | 16.04 | |
| | | | | | | | | | IRON | MG/KG | | 665.50 | |
| | | | | | | | | | MANGANESE | MG/KG | | 188.20 | |
| | | | | | | | | | SELENIUM | MG/KG | | 0.51 | |
| | | | | | | | | | ZINC | MG/KG | | 331.11 | |
| | | | | | | | | | COBALT | % | | 0.00 | |
| | | | | | | | | | FLUORINE | % | | 0.00 | |
| | | | | | | | | | IODINE | % | | 0.00 | |
| | | | | | | | | | BIOTIN | MG/KG | | 0.07 | |
| | | | | | | | | | CHOLINE | MG/KG | | 3148.88 | |
| | | | | | | | | | FOLIC ACID | MG/KG | | 6.88 | |
| | | | | | | | | | NIACIN | MG/KG | | 289.36 | |
| | | | | | | | | | PANT ACID | MG/KG | | 110.42 | |
| | | | | | | | | | VIT B6 | MG/KG | | 35.23 | |
| | | | | | | | | | RIBOFLAVIN | MG/KG | | 40.16 | |
| | | | | | | | | | THIAMIN | MG/KG | | 38.85 | |
| | | | | | | | | | VIT B12 | MCG/KG | | 33.00 | |
| | | | | | | | | | VIT E | MG/KG | | 204.41 | |
| | | | | | | | | | VIT K | MG/KG | | 13.20 | |
| | | | | | | | | | VIT A | IU/KG | | 413200.00 | |
| | | | | | | | | | VIT D | IU/KG | | 6600.00 | |
| | | | | | | | | | VIT C | MG/KG | | 5000.00 | |
| | | | | | | | | | NFE | % | | 26.64 | |

FIG. 11

| NUM | INGREDIENT | AMOUNTS ROUNDED | << PRICES >> LOW | TRUE | HIGH | <<<<PERCENT>>>>> MIN | DRY M | MAX | NUTRIENTS | UNITS | < AMOUNTS > MIN | ACTUAL | MAX |
|---|---|---|---|---|---|---|---|---|---|---|---|---|---|
| 60 | genencor | 1082.60 | 0.00 | 0.15 | | 50.000 | 54.130 | 80.000 | WEIGHT | | 1.000 | 1.00 | 1.001 |
| 13 | WHEAT MIDDLINGS | 766.30 | 0.00 | 5.25 | | 0.000 | 38.547 | 40.000 | AS FED | % | | 90.18 | |
| 53 | CANOLA OIL | 67.24 | 0.00 | 5.25 | | 0.000 | 3.352 | 10.000 | PROTEIN | % | 34.000 | 34.20 | 34.200 |
| 26 | CALCIUM PHOS DI | 38.80 | 0.00 | 5.25 | | 0.000 | 1.784 | 5.000 | AVAIL PHOS | % | 0.500 | 0.50 | 0.700 |
| 4 | METHIONINE | 9.70 | 0.00 | 50.00 | | 0.000 | 0.697 | 1.500 | CALCIUM | % | | 0.55 | |
| 33 | VITAMIN C | 9.70 | 0.00 | 625.00 | | 0.500 | 0.500 | 0.520 | FAT | % | 6.000 | 6.00 | 10.000 |
| 17 | CHOLINE 70% | 9.70 | 0.00 | 60.00 | | 0.400 | 0.400 | 0.400 | AVAIL ARG | % | 1.350 | 1.25 | noneERROR |
| 13 | CATFISH VIT MIX | 9.70 | 0.00 | 620.00 | | 0.300 | 0.300 | 0.310 | AVAIL HIST | % | 0.550 | 0.61 | none |
| 22 | CATFISH MIN MIX | 0.00 | 0.00 | 24.65 | | 0.150 | 0.150 | 0.160 | PHE & TYR | % | | 3.70 | |
| 37 | THR | 0.00 | 0.00 | 50.00 | | 0.000 | 0.230 | 0.500 | AVAIL ILEU | % | 0.990 | 2.39 | none |
| 95 | SOYBEAN OIL | | 0.00 | 5.25 | | | | 10.000 | AVAIL LEU | % | 1.090 | 2.09 | none |
| 3 | LYSINE | | 0.00 | 50.00 | | | | 2.000 | AVAIL LYS | % | 1.630 | 1.79 | none |
| | | | | | | | | | AVAIL MET | % | 0.860 | 0.86 | none |
| | | | | | | | | | AVAIL CYS | % | 0.170 | 0.17 | none |
| | | | | | | | | | A MET + CYS | % | 1.010 | 1.07 | none |
| | | | | | | | | | AVAIL PHEN | % | 1.200 | 1.19 | noneERROR |
| | | | | | | | | | AVAIL TYR | % | 0.570 | 0.89 | none |
| | TOTAL WEIGHT | 1993.74 | | | | | | | AVAIL THRE | % | 1.200 | 1.20 | none |
| | PRICE/TON(WET) | 160.41 | | | | | | | AVAIL TRYP | % | 0.320 | 0.17 | noneERROR |
| | PRICE/TON(DRY) | 160.41 | | | | | | | AVAIL VAL | % | 0.890 | 1.66 | none |
| | | | | | | | | | FIBER | % | 0.000 | 9.91 | 8.000 |
| | | | | | | | | | DE CAL/KG | | 2700.000 | 3222.52 | 3500.000 |
| | | | | | | | | | POTASSIUM | % | | 0.39 | |
| | ERROR | 0.1460 | | | | | | | CHLORINE | % | | 0.02 | |
| | | | | | | | | | MAGNESIUM | % | | 0.25 | |
| | | | | | | | | | SODIUM | % | | 0.07 | |
| | | | | | | | | | SULFUR | % | | 0.09 | |
| | | | | | | | | | COPPER | MG/KG | | 16.02 | |
| | | | | | | | | | IRON | MG/KG | | 387.12 | |
| | | | | | | | | | MANGANESE | MG/KG | | 198.54 | |
| | | | | | | | | | SELENIUM | MG/KG | | 0.59 | |
| | | | | | | | | | ZINC | MG/KG | | 341.86 | |
| | | | | | | | | | COBALT | % | | 0.00 | |
| | | | | | | | | | FLUORINE | % | | 0.00 | |
| | | | | | | | | | IODINE | % | | 0.00 | |
| | | | | | | | | | BIOTIN | MG/KG | | 0.09 | |
| | | | | | | | | | CHOLINE | MG/KG | | 3285.89 | |
| | | | | | | | | | FOLIC ACID | MG/KG | | 6.99 | |
| | | | | | | | | | NIACIN | MG/KG | | 299.38 | |
| | | | | | | | | | PANT ACID | MG/KG | | 112.38 | |
| | | | | | | | | | VIT B6 | MG/KG | | 36.12 | |
| | | | | | | | | | RIBOFLAVIN | MG/KG | | 40.41 | |
| | | | | | | | | | THIAMIN | MG/KG | | 38.36 | |
| | | | | | | | | | VIT B12 | MCG/KG | | 33.03 | |
| | | | | | | | | | VIT E | MG/KG | | 207.07 | |
| | | | | | | | | | VIT K | MG/KG | | 13.21 | |
| | | | | | | | | | VIT A | IU/KG | | 813213.20 | |
| | | | | | | | | | VIT D | IU/KG | | 6608.60 | |
| | | | | | | | | | VIT C | MG/KG | | 5009.00 | |
| | | | | | | | | | NFE | % | | 23.41 | |

FIG. 12

| NUM | INGREDIENT | AMOUNTS ROUNDED | < PRICES > LOW | TRUE HIGH | <<<<PERCENT>>>>> MIN | DRY M | MAX | NUTRIENTS | UNITS | < AMOUNTS > MIN | ACTUAL | MAX |
|---|---|---|---|---|---|---|---|---|---|---|---|---|
| | | | | | | | | WEIGHT | | 1.000 | 1.000 | 1.001 |
| 23 | CORN GLUTEN MEAL | 737.20 | 0.00 | 5.25 | 0.000 | 36.766 | 50.000 | AS FED | % | | 90.550 | |
| 5 | CORN GRAIN | 601.40 | 0.00 | 5.50 | 0.000 | 30.000 | 30.000 | PROTEIN | % | 36.000 | 36.200 | 34.200 |
| 160 | GENENCOR | 368.63 | 0.00 | 0.15 | 0.000 | 19.431 | 80.000 | AVAIL PHOS | % | 0.500 | 0.800 | 0.700 |
| 153 | CANOLA OIL | 114.03 | 0.00 | 5.25 | 0.000 | 5.701 | 10.000 | CALCIUM | % | | 0.910 | |
| 16 | CALCIUM PHOS DI | 77.60 | 0.00 | 5.25 | 0.000 | 3.757 | 5.000 | FAT | % | 8.000 | 8.000 | 10.000 |
| 6 | METHIONINE | 29.1 | 0.00 | 50.00 | 0.000 | 1.500 | 1.500 | AVAIL ARG | % | 1.300 | 1.130 | noneERROR |
| 3 | LYSINE | 19.40 | 0.00 | 50.00 | 0.000 | 0.953 | 2.000 | AVAIL HIST | % | 0.600 | 0.730 | none |
| 133 | VITAMIN C | 9.70 | 0.00 | 625.00 | 0.500 | 0.520 | 0.520 | PHE & TYR | % | | 3.700 | |
| 137 | THR | 9.70 | 0.00 | 50.00 | 0.000 | 0.500 | 0.500 | AVAIL ILEU | % | 1.100 | 2.820 | none |
| 17 | CHOLINE 70% | 9.70 | 0.00 | 60.00 | 0.400 | 0.400 | 0.400 | AVAIL LEU | % | 1.200 | 4.730 | none |
| 13 | CATFISH VIT MIX | 9.70 | 0.00 | 610.00 | 0.300 | 0.310 | 0.310 | AVAIL LYS | % | 1.800 | 2.000 | |
| 22 | CATFISH MIN MIX | 0.00 | 0.00 | 24.65 | 0.150 | 0.160 | 0.160 | AVAIL MET | % | 0.960 | 2.150 | none |
| 95 | SOYBEAN OIL | | | 5.25 | | | 10.000 | AVAIL CYS | % | 0.130 | 0.550 | none |
| 164 | CORN STEEP POWDER | | | 5.25 | | | 60.000 | A MET + CYS | % | 1.160 | 2.740 | none |
| | | | | | | | | AVAIL PHEN | % | 1.350 | 1.930 | none |
| | | | | | | | | AVAIL TYR | % | 0.640 | 1.580 | none |
| | TOTAL WEIGHT | 2006.16 | | | | | | AVAIL THRE | % | 1.350 | 1.660 | none |
| | PRICE/TON(WET) | 220.06 | | | | | | AVAIL TRYP | % | 0.200 | 0.220 | none |
| | PRICE/TON(DRY) | 220.06 | | | | | | AVAIL VAL | % | 1.000 | 1.770 | none |
| | | | | | | | | FIBER | % | 0.000 | 2.440 | 8.000 |
| | | | | | | | | DE | KCAL/KG | 2700.000 | 3500.000 | 3500.000 |
| | | | | | | | | POTASSIUM | % | | 0.110 | |
| | ERROR | 0.1090 | | | | | | CHLORINE | % | | 0.030 | |
| | | | | | | | | MAGNESIUM | % | | 0.080 | |
| | | | | | | | | SODIUM | % | | 0.040 | |
| | | | | | | | | SULFUR | % | | 0.200 | |
| | | | | | | | | COPPER | MG/KG | | 23.070 | |
| | | | | | | | | IRON | MG/KG | | 788.060 | |
| | | | | | | | | MANGANESE | MG/KG | | 175.340 | |
| | | | | | | | | SELENIUM | MG/KG | | 0.700 | |
| | | | | | | | | ZINC | MG/KG | | 391.630 | |
| | | | | | | | | COBALT | % | | 0.000 | |
| | | | | | | | | FLUORINE | % | | 0.010 | |
| | | | | | | | | IODINE | % | | 0.000 | |
| | | | | | | | | BIOTIN | MG/KG | | 0.090 | |
| | | | | | | | | CHOLINE | MG/KG | | 3082.550 | |
| | | | | | | | | FOLIC ACID | MG/KG | | 7.020 | |
| | | | | | | | | NIACIN | MG/KG | | 299.050 | |
| | | | | | | | | PANT ACID | MG/KG | | 114.640 | |
| | | | | | | | | VIT B6 | MG/KG | | 38.450 | |
| | | | | | | | | RIBOFLAVIN | MG/KG | | 41.870 | |
| | | | | | | | | THIAMIN | MG/KG | | 35.190 | |
| | | | | | | | | VIT B12 | MCG/KG | | 34.100 | |
| | | | | | | | | VIT E | MG/KG | | 222.600 | |
| | | | | | | | | VIT K | MG/KG | | 23.700 | |
| | | | | | | | | VIT A | IU/KG | | 813641.000 | |
| | | | | | | | | VIT D | IU/KG | | 6820.000 | |
| | | | | | | | | VIT C | MG/KG | | 5200.000 | |
| | | | | | | | | NFE | % | | 21.260 | |

FIG. 13

| NUM | INGREDIENTS | AMOUNTS ROUNDED | < PRICES > | | | < PERCENT > | | NUTRIENT | UNITS | < AMOUNTS > | | |
|---|---|---|---|---|---|---|---|---|---|---|---|---|
| | | | LOW | TRUE | HIGH | MIN | DRY M | MAX | | | MIN | ACTUAL | MAX |
| 160 | GENENCOR | 8.71.43 | 0.00 | 0.15 | 5.02 | 0.000 | 43.571 | 80.000 | WEIGHT | | 1 | 1.000 | 1.001 |
| 113 | WHEAT MIDDLINGS | 659.60 | 0.60 | 5.25 | 0.27 | 0.000 | 32.935 | 40.000 | AS FED | % | | | |
| 23 | CORN GULUTEN MEAL | 261.90 | 0.46 | 5.25 | 12.90 | 0.000 | 12.979 | 50.000 | PROTEIN | % | 36 | 36.000 | 36.200 |
| 153 | CANOLA OIL | 110.28 | 1.40 | 5.25 | 120.33 | 0.000 | 5.514 | 10.000 | AVAIL PHOS | % | 0.5 | 0.700 | 0.700 |
| 16 | CALCIUM PHOS DI | 29.10 | 0.91 | 5.25 | 33.69 | 0.000 | 1.605 | 5.000 | CALCIUM | % | | | |
| 164 | CORN STEEP MPOWDER | 21.18 | 0.00 | 5.25 | 21.78 | 0.000 | 1.059 | 60.000 | FAT | % | 8.00 | 8.000 | 12.000 |
| 4 | METHONINE | 9.70 | 0.00 | 50.00 | 329.80 | 0.000 | 0.504 | 1.500 | AVAIL ARG | % | 1.3 | 1.300 | NONE |
| 133 | VITAMIN C | 9.70 | 1.18 | 625.00 | NONE | 0.500 | 0.500 | 0.520 | AVAIL HIST | % | 0.6 | 0.600 | NONE |
| 17 | CHOLINE 70% | 9.70 | 1.18 | 60.00 | NONE | 0.400 | 0.400 | 0.400 | PHE & TYR | % | | | |
| 13 | CATFISH VIT MIX | 9.70 | 1.18 | 610.00 | NONE | 0.300 | 0.300 | 0.310 | AVAIL ILEU | % | 1.1 | 2.270 | NONE |
| 137 | THR | 0.00 | 0.00 | 50.00 | 739.24 | 0.000 | 0.137 | 0.500 | AVAIL LEU | % | 1.2 | 3.060 | NONE |
| 3 | LYSINE | 0.00 | 1.95 | 50.00 | 453.30 | 0.000 | 0.187 | 2.000 | AVAIL LYS | % | 1.4 | 1.800 | 2.000 |
| 22 | CATFISH MIN MIX | 0.000 | 1.180 | 24.65 | NONE | 0.15 | 0.150 | 0.150 | AVAIL MET | % | 0.96 | 0.860 | NONE |
| 95 | SOYBEAN OIL | | 0.000 | 5.25 | | | | 10.000 | AVAIL CYS | % | 0.17 | 0.320 | NONE |
| | | | | | | | | | A MET + CYS | % | 1.16 | 1.310 | NONE |
| | | | | | | | | | AVAIL PHEN | % | 1.35 | 1.690 | NONE |
| | | | | | | | | | AVAIL TYR | % | 0.64 | 1.160 | NONE |
| | TOTAL WEIGHT | 1992.28 | | | | | | | AVAIL THRE | % | 1.35 | 1.350 | NONE |
| | PRICE/TON(WET) | 172.61 | | | | | | | AVAIL TRYP | % | 0.2 | 0.200 | NONE |
| | PRICE/TON(DRY) | 172.61 | | | | | | | AVAIL VAL | % | 1.00 | 1.770 | NONE |
| | | | | | | | | | FIBER | % | 0 | 5.080 | 8.000 |
| | | | | | | | | | DE | KCAL/KG | 2700 | 3443.270 | 3500.000 |
| | | | | | | | | | POTASSIUM | % | | 0.390 | |
| | | | | | | | | | CHLORINE | % | | 0.030 | |
| | | | | | | | | | MAGNESIUM | % | | 0.150 | |
| | | | | | | | | | SODIUM | % | | 0.070 | |
| | | | | | | | | | SULFUR | % | | 0.130 | |
| | | | | | | | | | COPPER | MG/KG | | 20.910 | |
| | | | | | | | | | IRON | MG/KG | | 409.670 | |
| | | | | | | | | | MANGANESE | MG/KG | | 153.140 | |
| | | | | | | | | | SELENIUM | MG/KG | | 0.690 | |
| | | | | | | | | | ZINC | MG/KG | | 359.620 | |
| | | | | | | | | | COBALT | % | | 0.010 | |
| | | | | | | | | | FLUORINE | % | | 0.000 | |
| | | | | | | | | | IODINE | % | | 0.000 | |
| | | | | | | | | | BIOTIN | MG/KG | | 0.110 | |
| | | | | | | | | | CHOLINE | MG/KG | | 3339.260 | |
| | | | | | | | | | FOLIC ACID | MG/KG | | 6.970 | |
| | | | | | | | | | NIACIN | MG/KG | | 302.500 | |
| | | | | | | | | | PANT ACID | MG/KG | | 112.970 | |
| | | | | | | | | | VIT B6 | MG/KG | | 36.880 | |
| | | | | | | | | | RIBOFLAVIN | MG/KG | | 40.500 | |
| | | | | | | | | | THIAMIN | MG/KG | | 37.650 | |
| | | | | | | | | | VIT B12 | MCG/KG | | 33.000 | |
| | | | | | | | | | VIT E | MG/KG | | 209.600 | |
| | | | | | | | | | VIT K | MG/KG | | 13.200 | |
| | | | | | | | | | VIT A | IU/KG | | 413200.000 | |
| | | | | | | | | | VIT D | IU/KG | | 6600.000 | |
| | | | | | | | | | VIT C | MG/KG | | 5000.000 | |
| | | | | | | | | | NFE | % | | 23.37 | |

FIG. 14

| INGREDIENT | AMOUNTS ROUNDED | < PRICES > LOW | TRUE | HIGH | MIN | < PCT > DRY M | MAX | NUTRIENT | UNITS | MIN | < AMOUNTS > ACTUAL | MAX |
|---|---|---|---|---|---|---|---|---|---|---|---|---|
| CORN GLUTEN MEAL | 611.10 | 0.00 | 5.25 | | 0.00 | 30.315 | 50.000 | WEIGHT | | 1.00 | 1.00 | 1.001 |
| CORN GRAIN | 494.70 | 0.00 | 5.50 | | 0.00 | 24.751 | 30.000 | AS FED | % | | 90.68 | |
| GENENCOR | 300.00 | 0.00 | 0.15 | | 15.00 | 15.000 | 60.000 | PROTEIN | % | 36.00 | 36.00 | 36.200 |
| CORN STEEP POWDER | 300.00 | 0.00 | 5.25 | | 15.00 | 15.000 | 60.000 | AVAIL PHOS | % | 0.50 | 1.60 | 0.70ERROR |
| CANOLA OIL | 112.56 | 0.00 | 5.25 | | 0.00 | 5.628 | 10.000 | CALCIUM | % | | 1.20 | |
| CALCIUM PHOS DI | 97.00 | 0.00 | 5.25 | | 0.00 | 5.000 | 5.000 | FAT | % | 8.00 | 7.51 | 12.0ERROR |
| METHIONINE | 29.10 | 0.00 | 50.00 | | 0.00 | 1.500 | 1.500 | AVAIL ARG | % | 1.30 | 1.31 | NONE |
| LYSINE | 19.40 | 0.00 | 50.00 | | 0.00 | 0.912 | 2.000 | AVAIL HIST | % | 0.60 | 0.83 | NONE |
| VITAMIN C | 9.70 | 0.00 | 625.00 | | 0.50 | 0.520 | 0.520 | PHE & TYR | % | | 3.47 | |
| THR | 9.70 | 0.00 | 50.00 | | 0.00 | 0.500 | 0.500 | AVAIL ILEU | % | 1.10 | 1.70 | NONE |
| CHOLINE 70% | 9.70 | 0.00 | 60.00 | | 0.40 | 0.400 | 0.400 | AVAIL LEU | % | 1.20 | 4.50 | NONE |
| CATFISH VIT MIX | 9.70 | 0.00 | 610.00 | | 0.30 | 3.310 | 0.310 | AVAIL LYS | % | 1.80 | 2.00 | 2.000 |
| CATFISH MIN MIX | 0.00 | 0.00 | 24.65 | | 0.25 | 0.160 | 0.160 | AVAIL MET | % | 0.96 | 2.23 | NONE |
| SOYBEAN OIL | 0.00 | 0.00 | 5.25 | | | | 10.000 | AVAIL CYS | % | 0.19 | 0.70 | NONE |
| | | | | | | | | A MET + CYS | % | 1.15 | 2.94 | NONE |
| | | | | | | | | AVAIL PHEN | % | 1.35 | 1.63 | NONE |
| | | | | | | | | AVAIL TYR | % | 0.64 | 1.45 | NONE |
| TOTAL WEIGHT | 1999.97 | | | | | | | AVAIL THRE | % | 1.35 | 1.72 | NONE |
| PRICE/TON(WET) | 217.45 | | | | | | | AVAIL TRYP | % | 0.20 | 0.20 | NONE |
| PRICE/TON(DRY) | 217.45 | | | | | | | AVAIL VAL | % | 1.00 | 1.87 | NONE |
| | | | | | | | | FIBER | % | 0.00 | 1.95 | 8.000 |
| | | | | | | | | DE | KCAL/KG | 2700.00 | 3500.00 | 3500.000 |
| | | | | | | | | POTASSIUM | % | | 0.87 | |
| ERROR | 0.8953 | | | | | | | CHLORINE | % | | 0.16 | |
| | | | | | | | | MAGNESIUM | % | | 0.30 | |
| | | | | | | | | SODIUM | % | | 0.07 | |
| | | | | | | | | SULFUR | % | | 0.38 | |
| | | | | | | | | COPPER | MG/KG | | 26.28 | |
| | | | | | | | | IRON | MG/KG | | 971.41 | |
| | | | | | | | | MANGANESE | MG/KG | | 135.11 | |
| | | | | | | | | SELENIUM | MG/KG | | 0.78 | |
| | | | | | | | | ZINC | MG/KG | | 402.42 | |
| | | | | | | | | COBALT | % | | 0.15 | |
| | | | | | | | | FLUORINE | % | | 0.01 | |
| | | | | | | | | IODINE | % | | 0.00 | |
| | | | | | | | | BIOTIN | MG/KG | | 0.18 | |
| | | | | | | | | CHOLINE | MG/KG | | 4173.29 | |
| | | | | | | | | FOLIC ACID | MG/KG | | 6.99 | |
| | | | | | | | | NIACIN | MG/KG | | 322.45 | |
| | | | | | | | | PANT ACID | MG/KG | | 118.62 | |
| | | | | | | | | VIT B6 | MG/KG | | 40.69 | |
| | | | | | | | | RIBOFLAVIN | MG/KG | | 43.85 | |
| | | | | | | | | THIAMIN | MG/KG | | 36.09 | |
| | | | | | | | | VIT B12 | MCG/KG | | 34.10 | |
| | | | | | | | | VIT E | MG/KG | | 219.44 | |
| | | | | | | | | VIT K | MG/KG | | 13.69 | |
| | | | | | | | | VIT A | IU/KG | | 423640.82 | |
| | | | | | | | | VIT D | IU/KG | | 6820.00 | |
| | | | | | | | | VIT C | MG/KG | | 5200.00 | |
| | | | | | | | | NFE | % | | 17.09 | |

FIG. 15

| INGREDIENT | AMOUNTS ROUNDED | < PRICES > LOW | TRUE | HIGH | MIN | < PCT > DRY M | MAX | NUTRIENT | UNITS | MIN | < AMOUNTS > ACTUAL | MAX |
|---|---|---|---|---|---|---|---|---|---|---|---|---|
| CORN GLUTEN MEAL | 455.90 | 0.00 | 5.25 | | 0.000 | 23.023 | 50.000 | WEIGHT | | 1.00 | 1.00 | 1.001 |
| CORN GRAIN | 455.90 | 0.00 | 5.50 | | 0.000 | 22.630 | 30.000 | AS FED | % | | 90.66 | |
| CORN STEEP POWDER | 400.00 | 0.00 | 5.25 | | 20.000 | 20.000 | 60.000 | PROTEIN | % | 36.00 | 36.00 | 36.200 |
| genencor | 400.00 | 0.00 | 0.15 | | 20.000 | 20.000 | 60.000 | AVAIL PHOS | % | 0.50 | 1.78 | 0.70ERROR |
| CANOLA OIL | 103.77 | 0.00 | 5.25 | | 0.000 | 5.189 | 10.000 | CALCIUM | % | | 1.22 | |
| CALCIUM PHOS DI | 97.00 | 0.00 | 5.25 | | 0.000 | 5.000 | 5.000 | FAT | % | 8.00 | 6.92 | 12.0ERROR |
| METHIONINE | 29.10 | 0.00 | 50.000 | | 0.000 | 1.500 | 1.500 | AVAIL ARG | % | 1.30 | 1.36 | NONE |
| LYSINE | 19.40 | 0.00 | 50.00 | | 0.500 | 0.768 | 2.000 | AVAIL HIST | % | 0.60 | 2.86 | NONE |
| VITAMIN C | 9.70 | 0.00 | 625.00 | | 0.500 | 0.520 | 0.520 | PHE & TYR | % | | 3.22 | |
| THR | 9.70 | 0.00 | 50.00 | | 0.000 | 0.500 | 0.500 | AVAIL ILEU | % | 1.10 | 1.78 | NONE |
| CHOLINE 70% | 9.70 | 0.00 | 50.00 | | 0.400 | 0.400 | 0.400 | AVAIL LEU | % | 1.20 | 4.10 | NONE |
| CATFISH VIT MIX | 9.70 | 0.00 | 610.00 | | 0.300 | 0.310 | 0.310 | AVAIL LYS | % | 1.80 | 2.00 | 2.000 |
| CATFISH MIN MIX | 0.00 | 0.00 | 24.65 | | 0.150 | 0.160 | 0.160 | AVAIL MET | % | 0.96 | 2.17 | NONE |
| SOYBEAN OIL | 0.00 | 0.00 | 5.35 | | | | 10.000 | AVAIL CYS | % | 0.19 | 0.71 | NONE |
| | | | | | | | | A MET + CYS | % | 1.16 | 2.69 | NONE |
| | | | | | | | | AVAIL PHEN | % | 1.35 | 1.72 | NONE |
| | | | | | | | | AVAIL TYR | % | 0.64 | 1.33 | NONE |
| TOTAL WEIGHT | 1999.97 | | | | | | | AVAIL THRE | % | 1.35 | 1.73 | NONE |
| PRICE/TON(WET) | 217.45 | | | | | | | AVAIL TRYP | % | 0.20 | 0.16 | noneERROR |
| PRICE/TON(DRY) | 217.45 | | | | | | | AVAIL VAL | % | 1.00 | 1.85 | NONE |
| | | | | | | | | FIBER | % | 0.00 | 2.07 | 8.000 |
| | | | | | | | | DE | KCAL/KG | 2700.00 | 3500.00 | 3500.000 |
| ERROR | 1.0868 | | | | | | | POTASSIUM | % | | 1.13 | |
| | | | | | | | | CHLORINE | % | | 0.20 | |
| | | | | | | | | MAGNESIUM | % | | 0.37 | |
| | | | | | | | | SODIUM | % | | 0.07 | |
| | | | | | | | | SULFUR | % | | 0.42 | |
| | | | | | | | | COPPER | MG/KG | | 25.05 | |
| | | | | | | | | IRON | MG/KG | | 954.58 | |
| | | | | | | | | MANGANESE | MG/KG | | 168.07 | |
| | | | | | | | | SELENIUM | MG/KG | | 0.76 | |
| | | | | | | | | ZINC | MG/KG | | 396.60 | |
| | | | | | | | | COBALT | % | | 0.20 | |
| | | | | | | | | FLUORINE | % | | 0.01 | |
| | | | | | | | | IODINE | % | | 0.00 | |
| | | | | | | | | BIOTIN | MG/KG | | 0.20 | |
| | | | | | | | | CHOLINE | MG/KG | | 4516.50 | |
| | | | | | | | | FOLIC ACID | MG/KG | | 6.96 | |
| | | | | | | | | NIACIN | MG/KG | | 326.20 | |
| | | | | | | | | PANT ACID | MG/KG | | 119.40 | |
| | | | | | | | | VIT B6 | MG/KG | | 41.01 | |
| | | | | | | | | RIBOFLAVIN | MG/KG | | 44.26 | |
| | | | | | | | | THIAMIN | MG/KG | | 36.32 | |
| | | | | | | | | VIT B12 | MCG/KG | | 34.10 | |
| | | | | | | | | VIT E | MG/KG | | 216.72 | |
| | | | | | | | | VIT K | MG/KG | | 23.69 | |
| | | | | | | | | VIT A | IU/KG | | 413640.75 | |
| | | | | | | | | VIT D | IU/KG | | 6820.00 | |
| | | | | | | | | VIT C | MG/KG | | 5200.00 | |
| | | | | | | | | NPE | % | | 16.70 | |

FIG. 16

| NUM | INGREDIENTS | AMOUNTS ROUNDED | < PRICES > LOW | TRUE | HIGH | < PERCENT > MIN | DRY M | MAX | NUTRIENT | UNITS | < MIN | AMOUNTS > ACTUAL | MAX |
|---|---|---|---|---|---|---|---|---|---|---|---|---|---|
| 60 | genencor | 500.00 | 0.000 | 0.15 | | 25.00 | 25.000 | 60.000 | WEIGHT | | 1.00 | 1.000 | 1.002 |
| 64 | CORN STEEP POWDER | 500.00 | 0.000 | 5.25 | | 25.00 | 25.000 | 40.000 | AS FED | % | | 90.640 | |
| 25 | CORN GRAIN | 407.40 | 0.000 | 5.50 | | 0.00 | 20.509 | 30.000 | PROTEIN | % | 36.00 | 36.000 | 36.200 |
| 23 | CORN GLUTEN MEAL | 310.40 | 0.000 | 5.25 | | 0.00 | 15.727 | 50.000 | AVAIL PHOS | % | 0.50 | 1.970 | 0.70ERROR |
| 16 | CALCIUM PHOS DI | 97.00 | 0.000 | 5.25 | | 0.00 | 5.000 | 5.000 | CALCIUM | % | | 1.230 | |
| 53 | CANOLA OIL | 94..99 | 0.000 | 5.25 | | 0.00 | 4.749 | 10.000 | FAT | % | 8.00 | 6.320 | 12.00ERROR |
| 4 | METHIONINE | 29.10 | 0.000 | 50.00 | | 0.00 | 1.500 | 1.000 | AVAIL ARG | % | 1.30 | 1.400 | NONE |
| 3 | LYSINE | 9.70 | 0.000 | 50.00 | | 0.00 | 0.624 | 2.000 | AVAIL HIST | % | 0.60 | 0.880 | NONE |
| 13 | VITAMIN C | 9.70 | 0.000 | 625.00 | | 0.30 | 0.520 | 0.520 | PHE & TYR | % | | 2.970 | |
| 137 | THR | 9.70 | 0.000 | 50.00 | | 0.00 | 0.500 | 0.500 | AVAIL ILEU | % | 1.10 | 1.670 | NONE |
| 17 | CHOLINE 70% | 9.70 | 0.000 | 60.00 | | 0.40 | 0.400 | 0.400 | AVAIL LEU | % | 1.20 | 3.700 | NONE |
| 13 | CATFISH VIT MIX | 9.70 | 0.000 | 610.00 | | 0.30 | 0.310 | 2.310 | AVAIL LYS | % | 1.80 | 2.000 | 2.000 |
| 22 | CATFISH MIN MIX | 0.00 | 0.000 | 24.65 | | 0.15 | 0.160 | 2.150 | AVAIL MET | % | 0.96 | 2.120 | NONE |
| 35 | SOYBEAN OIL | 0.00 | 0.000 | 5.25 | | | | 10.000 | AVAIL CYS | % | 0.19 | 0.710 | NONE |
| | | | | | | | | | A MET + CYS | % | 2.16 | 2.830 | NONE |
| | | | | | | | | | AVAIL PHEN | % | 1.35 | 1.590 | NONE |
| | | | | | | | | | AVAIL TYR | % | 0.61 | 1.210 | NONE |
| | TOTAL WEIGHT | 1987.39 | | | | | | | AVAIL THRE | % | 1.35 | 1.750 | NONE |
| | PRICE/TON(WET) | 210.96 | | | | | | | AVAIL TRYP | % | 0.20 | 0.160 | noneERROR |
| | PRICE/TON(DRY) | 210.26 | | | | | | | AVAIL VAL | % | 1.00 | 1.880 | NONE |
| | | | | | | | | | FIBER | % | 0.00 | 2.190 | 8.000 |
| | | | | | | | | | DE | KCAL/KG | 2700.00 | 3500.000 | 3500.000 |
| | | | | | | | | | POTASSIUM | % | | 1.380 | |
| | | | | | | | | | CHLORINE | % | | 0.240 | |
| | | | | | | | | | MAGNESIUM | % | | 0.440 | |
| | | | | | | | | | SODIUM | % | | 0.070 | |
| | | | | | | | | | SULFUR | % | | 0.450 | |
| | | | | | | | | | COPPER | MG/KG | | 25.420 | |
| | | | | | | | | | IRON | MG/KG | | 937.750 | |
| | | | | | | | | | MANGANESE | MG/KG | | 190.030 | |
| | | | | | | | | | SELENIUM | MG/KG | | 0.730 | |
| | | | | | | | | | ZINC | MG/KG | | 390.780 | |
| | | | | | | | | | COBALT | % | | 0.250 | |
| | | | | | | | | | FLUORINE | % | | 0.010 | |
| | | | | | | | | | IODINE | % | | 0.000 | |
| | | | | | | | | | BIOTIN | MG/KG | | 0.220 | |
| | | | | | | | | | CHOLINE | MG/KG | | 4859.780 | |
| | | | | | | | | | FOLIC ACID | MG/KG | | 6.930 | |
| | | | | | | | | | NIACIN | MG/KG | | 330.950 | |
| | | | | | | | | | PANT ACID | MG/KG | | 120.180 | |
| | | | | | | | | | VIT B6 | MG/KG | | 41.320 | |
| | | | | | | | | | RIBOFLAVIN | MG/KG | | 44.670 | |
| | | | | | | | | | THIAMIN | MG/KG | | 36.580 | |
| | | | | | | | | | VIT B12 | MCG/KG | | 34.100 | |
| | | | | | | | | | VIT E | MG/KG | | 213.990 | |
| | | | | | | | | | VIT K | MG/KG | | 13.680 | |
| | | | | | | | | | VIT A | IU/KG | | 13640.700 | |
| | | | | | | | | | VIT D | IU/KG | | 6820.010 | |
| | | | | | | | | | VIT C | MG/KG | | 9200.000 | |
| | | | | | | | | | NPE | % | | 10.300 | |

FIG. 17

| NUM | INGREDIENT | AMOUNTS ROUNDED | < PRICES > LOW | TRUE HIGH | MIN | < PCT > DRY M | MAX | NUTRIENT | UNITS | MIN | < AMOUNTS > ACTUAL | MAX |
|---|---|---|---|---|---|---|---|---|---|---|---|---|
| 64 | CORN STEEP POWD | 600.00 | 0.00 | 5.25 | 30.00 | 30.000 | 60.000 | WEIGHT | | 1.000 | 1.00 | 1.002 |
| 60 | genencor | 600.00 | 0.00 | 0.15 | 30.00 | 30.000 | 40.000 | AS FED | % | | 90.62 | |
| 25 | CORN GRAIN | 368.60 | 0.00 | 5.50 | 0.00 | 18.388 | 30.000 | PROTEIN | % | 36.000 | 36.00 | 36.200 |
| 23 | CORN GLUTEN MEA | 164.90 | 0.00 | 5.25 | 0.00 | 8.431 | 50.000 | AVAIL PHOS | % | 0.500 | 2.16 | 0.70ERROR |
| 16 | CALCIUM PHOS DI | 97.00 | 0.00 | 5.25 | 0.00 | 5.000 | 5.000 | CALCIUM | % | | 1.24 | |
| 153 | CANOLA OIL | 86.20 | 0.00 | 5.25 | 0.00 | 4.310 | 10.000 | FAT | % | 6.000 | 5.72 | 12.00ERROR |
| 4 | METHIONINE | 29.10 | 0.00 | 50.00 | 0.00 | 1.500 | 1.000 | AVAIL ARG | % | 1.300 | 1.45 | NONE |
| 133 | VITAMIN C | 9.70 | 0.00 | 625.00 | 0.50 | 0.520 | 2.000 | AVAIL HIST | % | 0.600 | 0.31 | NONE |
| 137 | THR | 9.70 | 0.00 | 50.00 | 0.00 | 0.500 | 0.520 | PHE & TYR | % | | 2.72 | |
| 3 | LYSINE | 9.70 | 0.00 | 50.00 | 0.00 | 0.480 | 0.500 | AVAIL ILEU | % | 1.100 | 1.96 | NONE |
| 17 | CHOLINE 70% | 9.70 | 0.00 | 60.00 | 0.40 | 0.400 | 0.400 | AVAIL LEU | % | 1.200 | 3.30 | NONE |
| 13 | CATFISH VIT MIX | 9.70 | 0.00 | 610.00 | 0.30 | 0.310 | 2.310 | AVAIL LYS | % | 1.800 | 2.00 | 2.000 |
| 22 | CATFISH MIN MIX | 0.00 | 0.00 | 24.65 | 0.15 | 0.160 | 2.150 | AVAIL MET | % | 0.960 | 2.06 | NONE |
| 35 | SOYBEAN OIL | 0.00 | 0.00 | 5.25 | | | 10.000 | AVAIL CYS | % | 0.190 | 0.71 | NONE |
| | | | | | | | | A MET + CYS | % | 1.160 | 2.77 | NONE |
| | | | | | | | | AVAIL PHEN | % | 1.350 | 1.47 | NONE |
| | | | | | | | | AVAIL TYR | % | 0.640 | 1.09 | noneERROR |
| | TOTAL WEIGHT | 1994.3 | | | | | | AVAIL THRE | % | 1.350 | 1.77 | NONE |
| | PRICE/TON(WET) | 204.47 | | | | | | AVAIL TRYP | % | 0.200 | 0.14 | NONE |
| | PRICE/TON(DRY) | 204.47 | | | | | | AVAIL VAL | % | 1.000 | 1.90 | NONE |
| | | | | | | | | FIBER | % | 0.000 | 2.31 | 8.000 |
| | | | | | | | | DE | KCAL/KG | 2700.000 | 3500.00 | 3500.000 |
| | ERROR | 2.2558 | | | | | | POTASSIUM | % | | 1.43 | |
| | | | | | | | | CHLORINE | % | | 0.26 | |
| | | | | | | | | MAGNESIUM | % | | 0.51 | |
| | | | | | | | | SODIUM | % | | 0.08 | |
| | | | | | | | | SULFUR | % | | 0.50 | |
| | | | | | | | | COPPER | MG/KG | | 25.00 | |
| | | | | | | | | IRON | MG/KG | | 920.91 | |
| | | | | | | | | MANGANESE | MG/KG | | 151.99 | |
| | | | | | | | | SELENIUM | MG/KG | | 0.71 | |
| | | | | | | | | ZINC | MG/KG | | 384.95 | |
| | | | | | | | | COBALT | % | | 0.30 | |
| | | | | | | | | FLUORINE | % | | 0.01 | |
| | | | | | | | | IODINE | % | | 0.00 | |
| | | | | | | | | BIOTIN | MG/KG | | 0.24 | |
| | | | | | | | | CHOLINE | MG/KG | | 5203.22 | |
| | | | | | | | | FOLIC ACID | MG/KG | | 6.70 | |
| | | | | | | | | NIACIN | MG/KG | | 335.70 | |
| | | | | | | | | PANT ACID | MG/KG | | 120.97 | |
| | | | | | | | | VIT B6 | MG/KG | | 41.64 | |
| | | | | | | | | RIBOFLAVIN | MG/KG | | 45.10 | |
| | | | | | | | | THIAMIN | MG/KG | | 35.84 | |
| | | | | | | | | VIT B12 | MCG/KG | | 24.20 | |
| | | | | | | | | VIT E | MG/KG | | 211.26 | |
| | | | | | | | | VIT K | MG/KG | | 13.68 | |
| | | | | | | | | VIT A | IU/KG | | 13640.66 | |
| | | | | | | | | VIT D | IU/KG | | 6820.02 | |
| | | | | | | | | VIT C | MG/KG | | 5200.00 | |
| | | | | | | | | NFE | % | | 15.91 | |

FIG. 18

| NUM | INGREDIENT | AMOUNTS ROUNDED | PRICES LOW | PRICES TRUE | PRICES HIGH | PERCENT MIN | PERCENT DRY M | PERCENT MAX | NUTRIENT | UNITS | MIN | ACTUAL | MAX |
|---|---|---|---|---|---|---|---|---|---|---|---|---|---|
| 64 | CORN STEEP POWDER | 700.00 | 0.00 | 5.25 | | 35.00 | 35.000 | 60.00 | WEIGHT | | 1.00 | 1.00 | 1.001 |
| 60 | genencor | 700.00 | 0.00 | 0.15 | | 35.00 | 35.000 | 60.00 | AS FED | % | | 90.59 | |
| 25 | CORN GRAIN | 325.60 | 0.00 | 5.50 | | 0.00 | 16.269 | 38.00 | PROTEIN | % | 36.00 | 36.00 | 36.200 |
| 16 | CALCIUM PHOS DI | 97.00 | 0.00 | 5.25 | | 0.00 | 5.000 | 5.00 | AVAIL PHOS | % | 0.50 | 2.35 | 0.70ERROR |
| 153 | CANOLA OIL | 77.41 | 0.00 | 5.25 | | 0.00 | 3.871 | 10.00 | CALCIUM | % | | 1.26 | |
| 4 | METHIONINE | 29.10 | 0.00 | 50.00 | | 0.00 | 1.500 | 1.50 | FAT | % | 6.00 | 5.14 | 12.0ERROR |
| 13 | CORN GLUTEN MEAL | 19.40 | 0.00 | 5.250 | | 0.00 | 1.135 | 50.00 | AVAIL ARG | % | 1.30 | 1.49 | NONE |
| 133 | VITAMIN C | 9.70 | 0.00 | 625.00 | | 0.50 | 0.520 | 0.52 | AVAIL HIST | % | 0.60 | 0.93 | NONE |
| 137 | THR | 9.70 | 0.00 | 50.00 | | 0.00 | 0.500 | 0.50 | PHE & TYR | % | | 2.47 | |
| 3 | CHOLINE 70% | 9.70 | 0.00 | 60.00 | | 0.40 | 0.400 | 0.40 | AVAIL ILEU | % | 1.10 | 2.05 | NONE |
| 17 | LYSINE | 9.70 | 0.00 | 50.00 | | 0.00 | 0.337 | 2.00 | AVAIL LEU | % | 1.20 | 2.90 | NONE |
| 13 | CATFISH VIT MIX | 9.70 | 0.00 | 610.00 | | 0.30 | 0.310 | 0.31 | AVAIL LYS | % | 1.80 | 2.00 | 2.000 |
| 22 | CATFISH MIN MIX | 0.00 | 0.00 | 24.65 | | 0.25 | 0.160 | 0.16 | AVAIL MET | % | 0.96 | 2.00 | NONE |
| 35 | SOYBEAN OIL | 0.00 | 0.00 | 5.25 | | | | 10.00 | AVAIL CYS | % | 0.19 | 0.71 | NONE |
| | | | | | | | | | A MET + CYS | % | 1.16 | 2.72 | NONE |
| | | | | | | | | | AVAIL PHEN | % | 1.35 | 1.35 | NONE |
| | | | | | | | | | AVAIL TYR | % | 0.64 | 2.96 | NONE |
| | TOTAL WEIGHT | 2001.21 | | | | | | | AVAIL THRE | % | 1.35 | 1.79 | NONE |
| | PRICE/TON(WET) | 197.96 | | | | | | | AVAIL TRYP | % | 0.20 | 0.12 | noneERROR |
| | PRICE/TON(DRY) | 197.96 | | | | | | | AVAIL VAL | % | 1.00 | 1.93 | NONE |
| | | | | | | | | | FIBER | % | 0.00 | 2.43 | 8.000 |
| | | | | | | | | | DE | KCAL/KG | 2700.00 | 3500.00 | 3500.000 |
| | ERROR | 2.8562 | | | | | | | POTASSIUM | % | | 1.88 | |
| | | | | | | | | | CHLORINE | % | | 0.32 | |
| | | | | | | | | | MAGNESIUM | % | | 0.57 | |
| | | | | | | | | | SODIUM | % | | 0.08 | |
| | | | | | | | | | SULFUR | % | | 0.52 | |
| | | | | | | | | | COPPER | MG/KG | | 24.57 | |
| | | | | | | | | | IRON | MG/KG | | 904.97 | |
| | | | | | | | | | MANGANESE | MG/KG | | 193.95 | |
| | | | | | | | | | SELENIUM | MG/KG | | 0.68 | |
| | | | | | | | | | ZINC | MG/KG | | 379.24 | |
| | | | | | | | | | COBALT | % | | 0.35 | |
| | | | | | | | | | FLUORINE | % | | 0.01 | |
| | | | | | | | | | IODINE | % | | 0.00 | |
| | | | | | | | | | BIOTIN | MG/KG | | 0.26 | |
| | | | | | | | | | CHOLINE | MG/KG | | 5546.40 | |
| | | | | | | | | | FOLIC ACID | MG/KG | | 6.87 | |
| | | | | | | | | | NIACIN | MG/KG | | 340.45 | |
| | | | | | | | | | PANT ACID | MG/KG | | 121.75 | |
| | | | | | | | | | VIT B6 | MG/KG | | 41.96 | |
| | | | | | | | | | RIBOFLAVIN | MG/KG | | 45.68 | |
| | | | | | | | | | THIAMIN | MG/KG | | 37.11 | |
| | | | | | | | | | VIT B12 | MCG/KG | | 34.10 | |
| | | | | | | | | | VIT E | MG/KG | | 208.53 | |
| | | | | | | | | | VIT K | MG/KG | | 13.67 | |
| | | | | | | | | | VIT A | IU/KG | | 413640.54 | |
| | | | | | | | | | VIT D | IU/KG | | 6820.02 | |
| | | | | | | | | | VIT C | MG/KG | | 5200.00 | |
| | | | | | | | | | NFE | % | | 15.52 | |

FIG. 19

FISH FEED TRIAL

| FEED | DATE | #FISH | T.gr | gr/fish | %BW |
|---|---|---|---|---|---|
| GENENCOR | 11/19 | 230 | 1496 | 6.5 | 5% |
|  | 11/22 | 230 | 2300 | 10 | 5% |
|  | 12/4 | 230 | 3164 | 13.75 | 7% |
|  | 12/11 | 230 | 4629 | 20.13 | 7% |
|  | 12/26 | 218 | 5902 | 25.77 | 7% |
|  | 1/3 | 218 | 6583 | 29.92 | 7% |
|  | TOTAL |  | 5087 | 23.42 |  |
| ARKAT | 1/19 | 230 | 1496 | 6.5 | 5% |
|  | 11/22 | 230 | 2300 | 10 | 5% |
|  | 12/4 | 230 | 3071 | 13.3 | 7% |
|  | 12/11 | 230 | 3473 | 15.1 | 7% |
|  | 12/26 | 218 | 4653 | 21.34 | 7% |
|  | 1/3 | 218 | 5448 | 24.99 | 7% |
|  | TOTAL |  | 3952 | 18.49 |  |
| PURINA | 11/19 | 230 | 1496 | 6.5 | 5% |
|  | 11/22 | 230 | 2300 | 10 | 5% |
|  | 12/4 | 230 | 2610 | 11.35 | 7% |
|  | 12/11 | 230 | 3930 | 17.09 | 7% |
|  | 12/26 | 230 | 4767 | 21.66 | 7% |
|  | 1/3 | 226 | 5561 | 24.6 | 7% |
|  | TOTAL |  | 4065 | 18.1 |  |

COMMENTS

46 DAY TRIAL
FISH FED MORE VIGOROUSLY ON GENENCOR FEED.

ANIMAL FEED AND METHOD OF MAKING SAME

CROSS-REFERENCE TO RELATED APPLICATION

This application claims the benefit of U.S. Provisional Application Ser. No. 601120,580 filed Feb. 18, 1999.

BACKGROUND OF THE INVENTION

A. Field of the Invention

This invention relates to animal feeds, and in particular, to animal feeds made from protein-containing substances which can be of relatively high initial moisture content.

B. Problems in the Art

Most animal feeds have as a primary goal the provision of at least a minimum requirement of nutrition to sustain the animals to which it is fed. Cost is a critical factor, however. Therefore, there is a continual search for cost-effective animal feeds, not only to sustain animals, but in many cases and in particular for animals raised for human consumption, to cause enhanced growth and value.

A specific example illustrates this point. Fish have long been raised as a commodity for human consumption. Such activity has not been widespread, however. This may be changing. One reason fish farming has not become popular across the United States is the cost. Also, in many of the more northern climates, it is difficult to raise the fish on a continual basis, primarily because of cold and ice in the winter. Some fish breeds simply can not survive in more northern climates.

Attempts have been made to raise fish indoors. While this might solve the goal of raising fish year-round, it adds a level of cost which could preclude it. Buildings are needed and-expensive, as are water treatment systems for confined facilities. Heat and/or warm water must be supplied. The provision of heat can involve on the order of 15% to 20% of the cost of raising fish indoors in colder climates.

Notwithstanding the issue of providing sufficient heat, one way to reduce cost of raising fish would be to find a cheaper source of food for the fish. There are estimates that fish feed comprises around 40% to 50% of the cost of raising any fish commercially. Conventionally fish food can be purchased at many animal feed retailers and wholesalers, who sell a variety of manufacturers' products. Examples are fish food pellets from such sources as Purina, Kent Feeds, and Arkat. Some of these feeds are made from corn or soybeans, because of the protein content of such commodity grains and because of their availability and relatively low cost.

A number of substances exist that are protein-laden and which are relatively abundant. Some of those substances are byproducts of processes and some are even treated as wastes. For example, there are current processes that utilize commodity grains such as corn and soybeans to extract components that are used for both food and non-food products. One of those processes extracts certain enzymes from corn or soybeans. The enzymes are used to make detergents. In that process, organisms are inserted into a mixture containing the corn or soybeans. A significant amount of water is also in the mixture. A byproduct of the process is a sludge of relatively high water or moisture content (e.g. on the order of 85%) with about 14%–18% solids. The sludge is very high in amino acids (protein) and has an amino acid profile that is conducive for growth in animals, including fish. However, the solids also may include substances which are not environmentally friendly or acceptable. The processor must therefore expend considerable resources to process the byproduct into a form that can be disposed of and/or pay significant amounts to dispose of or land-fill the byproduct.

As can be appreciated, such a processor not only has no use for the byproduct, it also must pay to get rid of it. Compliance with governmental regulations can also add to the cost of handling of the byproduct.

Genencor, Inc. of Cedar Rapids, Iowa practices such a process. Millions of pounds of the byproduct are created per year. Companies such as Archer-Daniels-Midland (ADM) and others practice similar processes. Thus, protein-carrying substances of substantial quantities, yet traditionally handled as waste products, exist. Costs for disposal of such waste products can be significant, for example, on the order of $20 per ton. If millions of pounds of waste product are created per year, the disposal bill can approach or even exceed one million dollars per year.

It has been found that the waste byproduct in sludge form can not simply be fed to fish. The fish do not get enough of it for full nutritional value. It can foul the water. Also, in liquid form, it does not digest well and/or makes cleaning of the water after excrement more difficult. There is therefore a real need in the art for a protein-based animal feed that is nutritionally effective and yet more cost-effective than current feeds. There also is a real need to find a practical application for some otherwise waste byproducts.

It is therefore a primary object of the present invention to provide an animal feed and method of making the same which improves over problems and deficiencies in the state of the art.

Other objects, features, and advantages of the present invention are to provide an animal feed and method for making the same which:

a) is relatively low cost and cost effective;

b) utilizes what otherwise would be sewered or land-filled;

c) is environmentally friendly;

d) can be tailored for use for fish and for other animals;

e) utilizes a relatively readily available and abundant source of protein;

f) can be based primarily on commodity grains or agricultural products and byproducts;

g) can improve growth and feeding efficiency for at least some animals;

h) is at least as digestible as common animal feeds;

These and other objects, features, and advantages of the present invention will become more apparent with reference to the accompanying specification and claims.

SUMMARY OF THE INVENTION

The present invention relates to an animal feed and a method of making animal feed. The method includes mixing a protein containing substance with a carrier. The protein containing substance is tailored to provide at least a substantial portion of the protein requirements for a given animal. It can be a commodity grain byproduct. The carrier can be a substance to which the protein containing substance adheres and which can take the form of or be manipulated into feed particles or pellets. The final mixture is dried to a relatively low moisture content.

The animal feed can include the protein containing substance in combination which a carrier. One carrier can be a natural particle called wheat middlings. Other carriers could include soybean meal, ground corn, corn gluten meal, corn grain, wheat, corn steep powder, white fibre byproduct of corn through milling processes, and sawdust. The protein containing substance could be a commodity grain byproduct such as the waste byproduct from the process used to extract enzymes from corn or soybeans.

BRIEF DESCRIPTION OF THE DRAWINGS

FIG. 2 is a chart showing the chemical makeup of a mixture of animal feed according to the present invention utilizing the Genencor byproduct, wheat midds, soy products, and corn products configured to contain 34% crude protein;

FIG. 3 is a chart showing the chemical makeup of a mixture similar to that shown in FIG. 1, except that the mixture is configured to contain 30% crude protein;

FIG. 4 is a chart showing the chemical makeup of a feed mixture according to the present invention that includes the Genencor byproduct and wheat midds configured to contain 34% crude protein;

FIG. 5 is a chart showing a makeup of a mixture similar to that set forth in FIG. 4, except that the mixture is configured to contain 34% crude protein;

FIG. 6 is an amino acid profile of the Genencor byproduct mixed 80:20 with white fiber corn byproduct by milling processes;

FIG. 7 is an amino acid profile of a byproduct from Ajinomoto of Eddyville, Iowa;

FIG. 8 is a chart showing additional chemical analysis of the Ajinomoto byproduct of FIG. 7;

FIG. 9 is a chart showing additional analysis of the Ajinomot byproduct of FIG. 7;

FIG. 10 is a chart showing the makeup of a combination of the Genencor byproduct and wheat midds with other ingredients;

FIG. 11 is a chart showing an alternative combination utilizing the Genencor byproduct and wheat midds;

FIG. 12 is a chart showing another mixture according to the present invention where corn grain and corn gluten meal are mixed with the Genencor byproduct;

FIG. 13 is a chart showing another alternative mixture according to the present invention including the Genencor byproduct with wheat, corn gluten meal, and corn steep powder;

FIG. 14 is a chart showing the makeup of an alternative mixture according to the present invention including Genencor byproduct, wheat and corn steep powder, with the percentage of corn steep powder increased by 5% over the mixture shown in FIG. 13;

FIG. 15 is a chart showing the makeup of an alternative mixture that is the same as shown in FIG. 14, with the percentage of corn steep powder increased by 5%;

FIG. 16 is a chart showing a mixture that is the same as that shown in FIG. 15, with the percentage of corn steep powder increased by 5%;

FIG. 17 is a chart showing a mixture that is the same as the mixture shown in FIG. 16, except the corn steep powder percentage is increased by 5%;

FIG. 18 is a chart showing the composition of a mixture that is the same as that shown in FIG. 17, except that the percentage of corn steep powder has been increased by 5%;

FIG. 19 is a chart showing the results of a fish feed trial comparing a Genencor mixture according to the present invention with other commercially available fish feeds.

DETAILED DESCRIPTION OF THE PREFERRED EMBODIMENT

Overview

Figure 1:
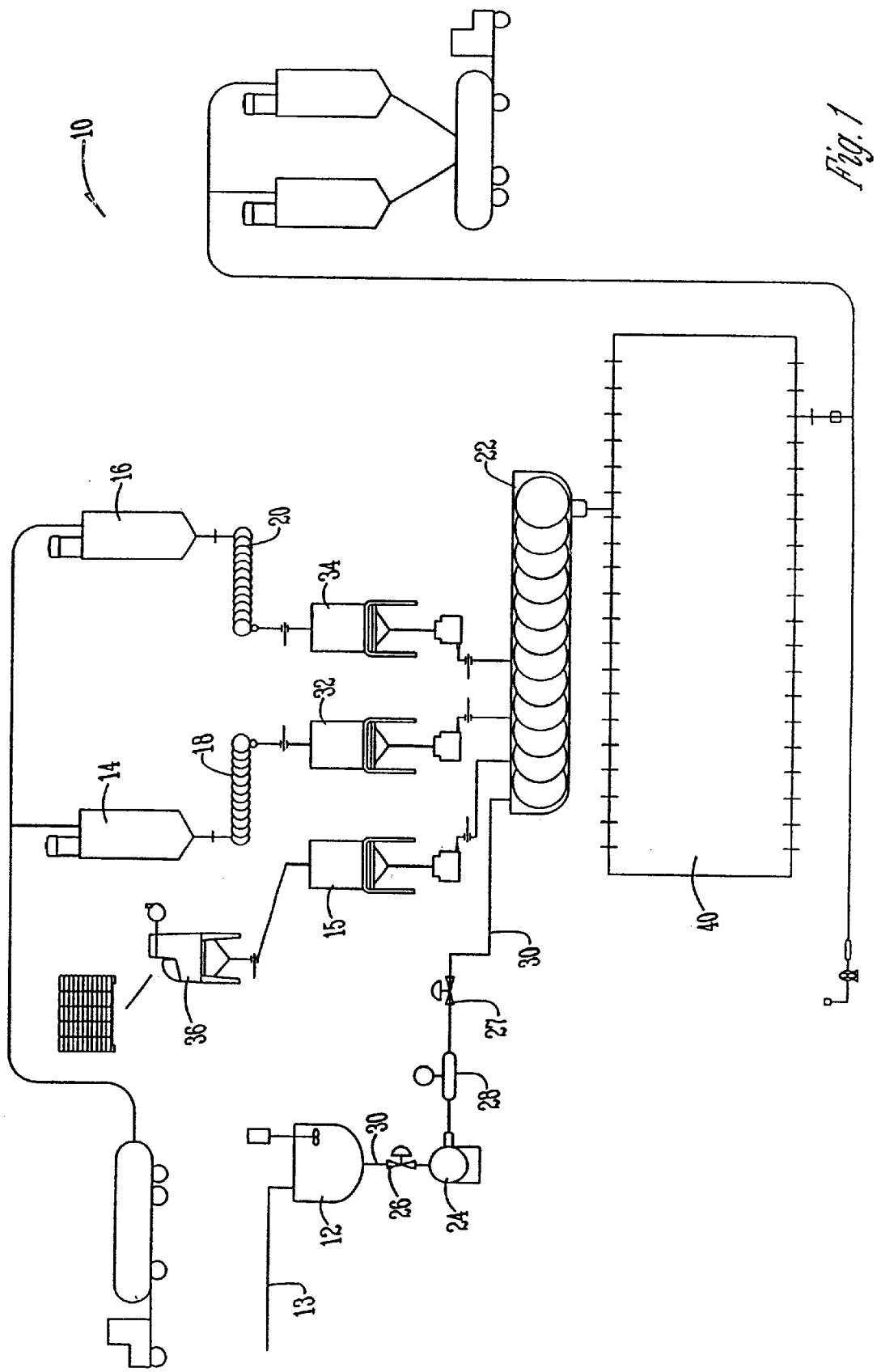
FIG. 1 is a diagram of a method of and facility for making an animal feed according to a preferred embodiment of the present invention.

To assist in an understanding of the invention, a detailed description of one embodiment according to the invention will now be set forth. The drawings accompanying this description will be sometimes referenced. Reference numerals and/or letters will be used to point out certain parts and locations in the drawings. The same reference numerals and/or letters will be used to indicate the same parts and locations throughout the drawings unless otherwise indicated.

Environment of Preferred Embodiment

The preferred embodiment will be discussed in the context of a fish food and the raising of fish. Further, the preferred embodiment will be discussed in the context of raising tilapia fish indoors. These fish, originally from Africa, require relatively warm water. Fish, at least of this type, typically require food that (a) is around 32% protein, (b) floats in the water, and (c) is effectively digestible.

The example of the preferred embodiment does not limit the invention. Variations obvious to those skilled in the art are included in the invention.

Production Facility

FIG. 1 diagrammatically illustrates a production facility to make feed for tilapia fish. Facility 10 includes a holding tank 12 (e.g. 3000 gallon with 7½ hp agitator) which receives via inlet 13 a soybean or corn based byproduct from Genencor, Inc. of Cedar Rapids, Iowa. The byproduct, a waste from a proprietary enzyme extracting process of Genencor, is in sludge form, having a basic make up of 85% water and 10% solids.

Bin 14 (e.g. 8'×8'×39' straightwall steel bin) holds a carrier, preferably wheat middlings, and can be filled by methods well known in the art. Wheat middlings are commercially available from a variety of sources. They are a remainder from the wheat plant after the wheat is extracted. They are basically particles or small pieces of the hulls of wheat. It is preferred that they be relatively dry.

Optionally, vitamins and minerals can be stored at bin 15. Such vitamins and minerals are also commercially available. Examples are Carp/Tilapia Vitamin Premix Product Code #5031 from International Nutrition, 6702 L Street, Omaha, Nebr. 68117. Premixes can be configured for different types of animals or fish. Examples are International Nutrition Product #5032 for trout and #5082 for shrimp. It is to be understood that vitamins and minerals, as well as other additives, fillers, or substances can be added according to choice and need. For example, additional vitamin C is indicated for fish raised indoors as opposed to outdoors.

Optionally, soybeans, corn, soybean meal, ground corn, or other substances could be stored in bin 16. Appropriate components are operatively connected to containers 12, 14, 15, and 16 to feed their contents to a mixer 22. For example, a pump 24 (e.g. a Moyno Progressing Cavity Pump, Model #1E022G1-CDQ-AA with 3 hp TEFC motor) can be used to pump the high moisture sludge from 12 to mixer 22 (e.g. Model DA 12–4.5 Continuous Double Agitator Mixer from Sprout-Bauer, Sherman Street, Muncy, Pa. 17756 (12" wide×4'-6" long, max. capacity 2 tons/hr, carbon steel or stainless steel with liquid manifold, V-belt drive and TEFC motor). Valves 26 and 27 can shut off the line 30 between tank 12 and mixer 22 and a flow meter 28 can be used to monitor flow of the substance through line 30.

Augers 18 and 20, with appropriate motors (not shown), convey the contents of hoppers 14 and 16 to conventional volumetric feeders 32 and 34 respectively. Device 36 (Andritz Sprout-Bauer Bag Dump Station) receives the contents of bagged vitamins and minerals (see 36) and feeds them to feeder 15.

System 10 therefore facilitates the delivery of the ingredients for the animal feed to storage containers 12, 36, 14, and 16. Suitable controlling hardware (not shown) would coordinate the operation of the components to feed desired proportions of the ingredients to mixer 22. Mixer 22 could alternatively be any of a variety of commercially available mixers.

The control system would also manage the operation of mixer 22. The output of mixer 22 would be fed to dryer 40 which would operated to dry the mixture to a desired moisture level. In the preferred embodiment, that moisture level is 10%–20%. Dryer 40 can be a fluidized bed dryer (e.g. Aeroglide Model C2-120-43 or C284-43RSC with oscillating belt feeder, two pass design, double plenum drier/cooler with required fans, burners, motor control center and control panel). It can utilize an Aeroglide oscillating spreader to spread the mixture to be dried across the width of the dryer. Other types of dryers are possible. Examples are rotary dryers or other conveyor-type dryers. It has been found that conveyor-type dryers are the most cost effective. With the two-pass fluidized bed conveyor dryers discussed previously, the first pass of mixture can be at a smaller average thickness (e.g. one to one and one half inches) than the second pass (e.g. three to four inches).

Mixing the sludge with the wheat middlings causes the relatively high moisture sludge to adhere to the wheat middlings. Because the wheat middlings are discrete particles, it is believed that they allow a greater surface area of the sludge to be exposed during the drying process. The sludge is dried onto the wheat middlings (to a moisture level of 10%–20%) and is therefore a relatively dry and buoyant product which can be transported by air pressure (see blower 42, e.g. an Andritz Sprout-Bauer industrial fan) through line 44 to holding hoppers or bins 46 and 48 (including filter receivers and bin vents from Andritz Sprout-Bauer). The conveying system of system 10 can be primarily pneumatic (see, e.g., Andritz Sprout-Bauer Pneu-Flo ☐ Positive Pressure Conveying Systems or Pneu-Pac ☐ Negative/Positive Systems). The dried feed mixture can then be stored (for up to several months) and dispensed as needed.

Composition

The animal feed of the preferred embodiment has two primary initial components. The first substance is a sludge, relatively high in moisture content (approx. 85% moisture by weight), that is a byproduct of a process used to extract enzymes from commodity grains (e.g. corn, soybeans, cotton, wheat, etc.). The process produces a waste stream that is very high in amino acids (protein). An example of such a byproduct is available from Genencor, Inc. of Cedar Rapids, Iowa.

Other byproducts that can be used are available from sources such as Archer-Daniels-Midland (ADM), Ajinomoto of Eddyville, Iowa, Penford Products Co. of Cedar Rapids, Iowa, and Jones & Kintz of Cedar Rapids, Iowa (e.g. 26% protein, $125/ton).

The Genencor sludge is considered a biomass. Its proposed use herein as a raw material of animal feed which is regulated by the Center for Veterinary Medicine (CVM) of the federal Food and Drug Administration (FDA). It can be characterized as a liquid *Bacillus subtilis* fermentation product, as listed in the Handbook of the Association of American Feed Control Officials (AAFCO) under categories 36.11 and 36.12.

The waste stream of the production process contains only a small amount of enzymes in the cell masses. It can include however a wide range of amino acid sequences. The cells in the biomass are inactivated by heat treatment and/or adjusting the pH of the waste stream.

One aspect of the Genencor byproduct that can be advantageous is that the byproduct contains a polymer that is edible and non-toxic. It is not believed to have any affect on growth, but with respect to fish, it appears to materially help in maintaining water quality for the fish. It is believed that the polymer acts a binder or a congealing agent for the fish excrement, making the excrement more of a solid. It is therefore easier to filter out or otherwise remove from the water. This results in cleaner water and a healthier condition for the fish.

Note that the protein value of the Genencor byproduct is generally in the range of protein desired for animals. For example, a conventional protein range for fish food is 26%–42%, with 32% a conventional choice for fish, including tilapia. Dog food are conventionally in the 27%–29% protein range. Many other animals' food is lower, perhaps even in the 15%–20% range.

The above percentages of protein are by weight. Therefore, the final percentage of protein can be adjusted as needed by adding filler or other substances to the mixture.

The second substance is what will be referred to herein as a carrier. The sludge adheres to or is partially absorbs by the carrier. The combined sludge and carrier then can be transported and more easily dried. Wheat middlings, dried to relatively low moisture, can be the carrier. They are edible, non-toxic, mixable with the sludge and buoyant so that the animal feed, if needed, tends to float, which is desired for fish food.

Alternative carriers could be any substance that has the desired characteristics, as mentioned above. An example is soybean meal. It is the price range of $40 to $160/ton. It can be ground into finer particles if used to create food for small fish, for example. It could be ground into larger particles for larger fish or animals.

The mixture of the two substances produces an animal feed that has protein for meeting the nutritional needs of animals. Four examples of the chemical make-up of the mixture are set forth in the charts shown in FIGS. 2–5 as follows. As shown, these are rations to make essentially on ton of feed. FIGS. 2 and 3 include not only a mixture of Genencor byproduct and wheat midds, but also the further inclusion of soy and corn products. The mixture of FIG. 2 is configured to contain 34% crude protein; the mixture of FIG. 3 is configured to contain 30% crude protein. The mixtures of FIGS. 4 and 5 contain only the Genencor byproduct and wheat midds at 34% and 30% crude protein respectively. Mixtures of all four charts include a conventional fish food vitamin and mineral premix, choline Cl, vitamin C, and a lipid source.

It was found that use of the 34% crude protein mixtures was best to get the amino acids needed to the fish. For examples of amino acid profiles that could be useful with the invention refer to FIGS. 6 and 7 below. FIG. 6 is a chart showing an amino acid profile of Genencor by-product described previously mixed 80:20 with white fiber corn byproduct by milling processes, a byproduct that can be purchased from Penford Products, Inc. of Cedar Rapids, Iowa. An example of such white fiber sold by Penford Products is under the name Litefibre. FIG. 7 is a chart showing an amino acid profile of a byproduct from Ajinomoto of Eddyville, Iowa. FIGS. 8 and 9 also include other information about the Ajinomoto byproduct.

While no ratio of byproduct to carrier is required, it has been found that in the case of the Genencor byproduct and wheat middlings, a ratio of byproduct to middlings of at least 50:50 is desired. As previously discussed, the byproduct is available for little or no cost. Therefore, as much byproduct as possible in the mixture is the most economical feed. Even though relatively inexpensive (e.g. $40/ton), the more wheat midds used the higher the material costs of the feed. Furthermore, enough wheat midds must be used to effectively take up the byproduct, carry it into the dryer (e.g. on a belt) and expose as much of the byproduct as possible for better drying.

Mixture ratios of 40:60 byproduct to wheat midds were tried, but they would be more expensive. Mixture ratios of around 60:40 by weight were found to work well because there was enough wheat midds to soak up the byproduct and carrier it into and through a dryer and to expose the byproduct for sufficient drying. Above 60:40 by weight could result in clogging problems.

Following is an example of a mixture to make one ton of feed:
  2400# of Genencor byproduct sludge (at 85% moisture)
  1600# of wheat midds (at 10% moisture)

This totals 4000# of wet product (60% moisture). The wet product is dried to remove 2000# of moisture, leaving 2000# of relatively dry feed.

The cost of the sludge is negligible. It can literally be no cost. Heat for drying (e.g. steam heat, gas fired, electric) could be between $10 and $25 per ton. Wheat midds cost around $40–$50 per ton. Electricity (approx. $5 per ton) and labor (approx. $7 per ton) result in a total of approx. $60–$80 per ton. Vitamin/mineral premixes might add $20 per ton. This can be compared with the current prices for commercial pelletized fish food of in the range of $250 to $400 per ton. Ground corn or soybeans could be added, especially for cattle or swine feeds and the cost calculated.

The following charts are other examples of compositions that could be used according to the invention. FIG. 10 is a chart that shows the make-up of a combination of Genencor by-product and wheat midds with other ingredients as shown. FIG. 11 is a chart that shows a slightly different combination but primarily based on the combination of Genencor by-product and wheat midds. FIG. 12 is a chart of a mixture that differs in that corn grain and corn gluten meal are mixed with Genencor by-product and the other listed components. FIG. 13 is a chart that shows a mixture of Genencor by-product with wheat, corn gluten meal and corn steep powder, along with the other listed components. FIGS. 14–18 show charts of mixtures of Genencor by-product with corn steep powder, corn grain, corn gluten meal with the Genencor by-product and corn steep powder increased in 5% gradations. A ratio of 80:20 by weight by-product to Penford white fiber carrier was found to work well, but 60:40 and even 40:60, and ratios in between are believed to work.

Method of Making the Composition

The method of making the composition has been substantially described above. Mixing times and drying times and temperature are well within the skill of those skilled in the art to result in a final product that has moisture of about 10% to 20%.

Examples regarding drying of the mixture are as follows. It is estimated that the drying of a little over 74 tons of the mixture per day at approximately 52% WWB is possible down to a target of 13% WWB. It is estimated that approximately 6000 lbs. of steam would be needed to evaporate 2000 lbs. (1 ton) of moisture from the mixture. For millions of pounds of mixture, this represents a substantial drying cost (e.g. approx. $3.50 per 1000 lbs. of steam) means several hundred thousand dollars of steam costs for drying).

The resulting composition has the correct amount of protein for fish (approx. 32%), is relatively dry (approx. 10%–20% moisture) for handling, storage, and shelf life, and floats. It can be formed into generally uniform shapes. For example, it can be extruded into pellets like certain current fish food.

It has been found that the best way to dry the mixture is with air and heat. Air alone has been found to generate molds in the mixture. Heat alone risks burning of the mixture. Too much air causes the mixture to blow off the conveyor. Too much heat tends to burn the product. Persons skilled in the art, knowing these considerations, will be able to set up dryer 40 to avoid the above-discussed problems.

It should be noted that an option would be to dry the initial mixture, then mix more raw sludge with the dried mixture. This would allow more protein to be carried by the carrier pieces or particles and would be a way to use up more of the sludge.

It is preferred that the processing system for the feed by on a continuous basis as opposed to batch processing. It is believed this is the most efficient and economical way. Companies such as Andritz Sprout-Bauer sell design conveying, mixing, and drying systems that could be utilized for this method.

As mentioned, the mixture could be extruded to form pellets. An Andritz Sprout-Bauer thermo-mechanical extruder could be used. A 3/32Δ die could be used for pellets for small fish. A 1/8" die could be used for larger fish.

Options, Features, and Advantages

It will be appreciated that the present invention can take many forms and embodiments. The true essence and spirit of this invention are defined in the appended claims, and it is not intended that the embodiment of the invention presented herein should limit the scope thereof. Variations obvious to one skilled in the art will be included within the invention defined by the claims.

Tests have been conducted which indicate that the mixture of Genencor byproduct and wheat midds results in increased growth rates of tilapia, but also increased feed efficiency. It should work similarly for most other fish.

FIG. 19 shows the results of the Genencor byproduct/wheat midds mixture ("Genencor") versus commercial fish foods from Arkat and Purina. All fish started the 46-day test at 6.5 grams per fish. At the end of the test, the largest fish were those fed the Genencor byproduct/wheat midds mixture. Note also that the fish fed more vigorously on that mixture than the other feeds. The results show approximately 26% better results with the invention than the commercial feeds tested.

Chart 19 shows the results of a comparison test between an experimental mixture ("Diet 2") and a standard commercial diet ("Diet 1"). Diet w was formulated like the commercial diet using the standard nutrient requirements for tilapia as determined and presented in the revised National Research Council's Nutrient Requirements of Fish (1993). The treated Genencor byproduct was used in the experimental diet as a replacement for protein. Diets were mixed under standard operation procedures as described by the American Feed Control Officials, Inc., publication (1998). The ingredients were admixed and the entire mixture was extruded for each diet. Diets were fed ad libitium four times per day. Two hundred tilapia were fed Diet 2 and 12,000 tilipia were fed Diet 1.

The fish receiving the commercial diet were weighed on day zero of the study and at the end of the experimental period. The fish fed the experimental treated diet were closely monitored throughout the study. The fish fed Diet 2 were weighed four times, at the beginning of the trial, on day seven, on day 14, and on day 21, respectively. This allowed the investigators to closely observe animal performance over the experimental period.

No adverse reaction to the diet utilizing the Genencor byproduct was observed. The tilapia were aggressive feeders and showed no signs of dislike for Diet 2. Diet consumption and weight gain for the tilapia are described in Chart 20. The tilapia appeared to like the feed containing Diet 2. The weight gain of the tilapia fed the commercial diet was 0.74 grams per day per fish while the weight gain for the tilapias fed Diet 2 was 0.762 grams per day per fish.

CHART 1

Mean initial weight and mean weekly weight of tilapia fed a diet containing the treated biomass

| Diet | Number/Fish | Mean Tilapia Weight Grams | | | | Mean Gain/Day |
| | | Day 0 | Day 7 | Day 14 | Day 21 | Grams |
|---|---|---|---|---|---|---|
| 1 | 12000 | 25 | | | 40 | 0.714 |
| 2 | 200 | 25 | 30 | 33 | 41 | 0.762 |

It is to be understood that the preferred embodiment was discussed in relation to a fish food tailored for tilapia. Compositions and methods according to the invention can be used to create animal feeds for other fish, for livestock such as cattle, swine, chickens, turkeys, sheep, etc., and for pets such as dogs and cats. Other animals are possible.

The protein-laden part of the mixture can come from a variety of sources, including commodity grain byproducts, but is not so limited.

The carrier part of the mixture can be a number of different substances. Some such substances may themselves contain protein. In such cases, the main protein-containing part of the mixture can be adjusted or selected to contain less protein, depending on the level needed.

It is preferable that fish food float. Therefore, the food in usually extruded into pellets or shapes. Of course, this is not needed for food for most other animals.

Use of the mixture with pigs has been shown in preliminary testing to be promising. It appears to be palatable to dogs and other animals.

Note that protein levels discussed herein are minimums. Sometimes too much protein in feed is not advantageous. The levels discussed and known in the art are the result of balancing the nutritional needs versus the possible undesired effects of too much protein in a diet.

What is claimed is:

1. An animal food made according to the process comprising:
   mixing into a mixture (a) a commodity grain byproduct comprising a sludge produced during a process to remove certain enzymes from a commodity grain, said sludge having a protein value in the range of 10 to 50 percent and (b) a carrier comprising a plurality of discrete particles capable of at least partially absorbing said commodity grain byproduct so that the carrier significantly increases exposure of the commodity grain byproduct to air; and
   drying the mixture to a moisture content in the range of 10% to 20%.

2. The animal food of claim 1 wherein the commodity grain is selected from the group consisting of corn and soybeans.

3. The animal food of claim 2 wherein the sludge has a moisture content of at least approximately 82% and comprises biomass including polymers.

4. The animal food of claim 1 wherein the carrier is buoyant in water.

5. The animal food of claim 4 wherein the carrier is wheat middlings.

6. The animal food of claim 5 wherein the wheat middlings have a moisture content of 10% or less.

7. The animal food of claim 5 wherein the ratio of wheat middlings to grain byproduct is approximately 50:50.

8. The animal food of claim 7 wherein the ratio is about 40:60.

9. The animal food of claim 4 wherein the carrier is a white fiber from corn in a milling process.

10. The animal food of claim 9 wherein the ratio of by-product to carrier is from about 40:60 to about 80:20.

11. The animal food of claim 10 wherein the ratio is about 80:20.

12. The animal food of claim 1 wherein the drying is accomplished with air and heat.

13. The animal feed of claim 1 wherein the carrier is selected from one or more of the group consisting of wheat, wheat middlings, corn grain, corn gluten meal, and corn steep powder.

14. A composition for an animal food comprising: a commodity grain byproduct in the form of a sludge produced during a process to extract enzymes from a commodity grain; and wheat middlings.

15. The composition of claim 14 having protein in the range of 25% to 45%.

16. The composition of claim 15 wherein the protein is approximately 32%.

17. The composition of claim 14 having a moisture content of approximately 10% to 20%.

18. The composition of claim 14 further comprising added vitamins and minerals.

19. The composition of claim 14 wherein the animal food is for fish, the protein is approximately 32% and the moisture content is approximately 13%.

20. A method of producing an animal food comprising:
   collecting a quantity of a first substance, the first substance comprising a byproduct of the process of deriving an enzyme from at least one of corn and soybeans;
   collecting a quantity of a carrier, the carrier having the characteristics of being edible, non-toxic, and mixable with the first substance;
   mixing the first substance and the carrier; and
   drying the mixture.

21. A method of making animal feed comprising:
   mixing approximately 50:50 a protein-laden first substance comprising a corn or soybean based byproduct of an enzyme extraction process in sludge form with a second substance that acts as a carrier of the first substance, the second substance having the characteristics of being in discrete particles, edible, non toxic, and mixable with the first substance; and
   drying the mixture to a moisture content of between 10% and 20%.

22. The method of claim 21 wherein said second substance is selected from the group consisting of wheat middlings, saw dust, ground corn, soybean meal, and talc.

23. The method of claim 22 wherein the second substance is wheat middlings having a moisture content of no more than 10%.

24. The method of claim 21 wherein the mixture is about 60% first substance and 40% second substance.

25. The method of claim 24 wherein the mixture is a fish food and the protein level is approximately 25% to 45%.

26. The method of claim 21 wherein the drying comprises passing heated air around the mixture.

* * * * *